US009769338B2

(12) United States Patent
Ogino et al.

(10) Patent No.: US 9,769,338 B2
(45) Date of Patent: *Sep. 19, 2017

(54) OPERATION CONSOLE WITH ENHANCED CONFIGURATION OF OPERATION BUTTONS FOR COMMAND INPUTS, AND ELECTRONIC DEVICE AND IMAGE PROCESSING APPARATUS PROVIDED WITH THE OPERATION CONSOLE

(71) Applicant: Sharp Kabushiki Kaisha, Osaka (JP)

(72) Inventors: Kumiko Ogino, Osaka (JP); Takaya Nakatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,460

(22) Filed: Oct. 13, 2016

(65) Prior Publication Data

US 2017/0034371 A1 Feb. 2, 2017

Related U.S. Application Data

(63) Continuation of application No. 14/685,939, filed on Apr. 14, 2015, now Pat. No. 9,503,593, which is a (Continued)

(30) Foreign Application Priority Data

Feb. 18, 2010 (JP) .................................. 2010-033290

(51) Int. Cl.
G06F 15/00 (2006.01)
H04N 1/00 (2006.01)
G03G 15/00 (2006.01)

(52) U.S. Cl.
CPC ....... *H04N 1/00384* (2013.01); *G03G 15/502* (2013.01); *G03G 15/5016* (2013.01);
(Continued)

(58) Field of Classification Search
None
See application file for complete search history.

(56) References Cited

U.S. PATENT DOCUMENTS 5,565,964 A 10/1996 Tashiro et al.
9,030,679 B2 5/2015 Yoshida et al.
(Continued)

FOREIGN PATENT DOCUMENTS

JP 10-079819 A 3/1998
JP 2001-245085 A 9/2001
(Continued)

OTHER PUBLICATIONS

Co-pending U.S. Appl. No. 14/685,939, filed Feb. 8, 2011.
(Continued)

*Primary Examiner* — Helen Q Zong
(74) *Attorney, Agent, or Firm* — Renner, Otto, Boisselle & Sklar, LLP

(57) ABSTRACT

An operation console used in relation to an apparatus as an object of control operated by a user operation includes: a display device having a display area for displaying information to the user; an input device for the user to input a request; and a display control device displaying, if a request for displaying specific information on said display device is input through the input device, the specific information on the display device. The input device includes a plurality of operation buttons for inputting a plurality of requests, corresponding to respective requests, arranged in the vicinity of the display area. Among the plurality of operation buttons, an operation button corresponding to the request for displaying the specific information is provided closest to the display device.

8 Claims, 13 Drawing Sheets

Related U.S. Application Data continuation of application No. 13/022,728, filed on Feb. 8, 2011, now Pat. No. 9,036,167.

(52) U.S. Cl.
CPC ....... *H04N 1/0044* (2013.01); *H04N 1/00392* (2013.01); *H04N 1/00408* (2013.01); *H04N 1/00411* (2013.01); *H04N 1/00413* (2013.01); *H04N 1/00474* (2013.01); *H04N 1/00493* (2013.01); *H04N 1/00503* (2013.01); *H04N 2201/0094* (2013.01)

(56) References Cited

U.S. PATENT DOCUMENTS

| | | | |
|---|---|---|---|
| 9,036,167 | B2 | 5/2015 | Ogino et al. |
| 2004/0134370 | A1 | 7/2004 | Katamoto et al. |
| 2004/0141761 | A1 | 7/2004 | Ikegawa |
| 2006/0031238 | A1 | 2/2006 | Baba |
| 2006/0044580 | A1 | 3/2006 | Maeda |
| 2006/0167573 | A1 | 7/2006 | Yamada |
| 2006/0187483 | A1 | 8/2006 | Baba |
| 2006/0248473 | A1 | 11/2006 | Nagumo |
| 2007/0216965 | A1 | 9/2007 | Yoshihama |
| 2007/0229926 | A1 | 10/2007 | Morisaki et al. |
| 2008/0062468 | A1 | 3/2008 | Shouno |
| 2008/0218481 | A1 | 9/2008 | Watabe et al. |
| 2009/0037716 | A1 | 2/2009 | Okamoto et al. |
| 2009/0168098 | A1 | 7/2009 | Tanaka |
| 2009/0319168 | A1 | 12/2009 | Sugimoto |
| 2010/0322640 | A1 | 12/2010 | Yamada |
| 2012/0036470 | A1 | 2/2012 | Homma |
| 2012/0148115 | A1 | 6/2012 | Birdwell et al. |
| 2012/0329441 | A1 | 12/2012 | Tseng |

FOREIGN PATENT DOCUMENTS

| | | |
|---|---|---|
| JP | 2005-197924 A | 7/2005 |
| JP | 2006-201585 A | 8/2006 |
| JP | 2006-308831 A | 11/2006 |
| JP | 2007-267254 A | 10/2007 |
| JP | 2008-042706 A | 2/2008 |
| JP | 2008-217576 A | 9/2008 |
| JP | 2008-298987 A | 12/2008 |
| JP | 2009-159301 A | 7/2009 |
| JP | 2004-347630 A | 12/2009 |
| JP | 2010-003007 A | 1/2010 |
| JP | 2010-011049 A | 1/2010 |

OTHER PUBLICATIONS

Non-Final Office Action for related U.S. Appl. No. 14/685,939 dated Apr. 7, 2016.

Non-Final Office Action for related U.S. Appl. No. 14/683,500 dated Feb. 10, 2016.

Non-Final Office Action for related U.S. Appl. No. 14/683,500 dated Aug. 16, 2016.

OPERATION CONSOLE WITH ENHANCED CONFIGURATION OF OPERATION BUTTONS FOR COMMAND INPUTS, AND ELECTRONIC DEVICE AND IMAGE PROCESSING APPARATUS PROVIDED WITH THE OPERATION CONSOLE

CROSS-REFERENCE TO RELATED APPLICATION

This is a continuation of U.S. application Ser. No. 14/685,939 filed on Apr. 14, 2015, which is a continuation of U.S. application Ser. No. 13/022,728 filed on Feb. 8, 2011, which claims priority under 35 U.S.C. §119(a) on Patent Application 2010-033290 filed in Japan on Feb. 18, 2010, the entire contents of which are hereby incorporated by reference.

BACKGROUND OF THE INVENTION

Field of the Invention

The present invention relates to an operation console including a display unit for displaying information to a user. More specifically, the present invention relates to an operation console allowing the user to accurately select and operate an operation button for displaying a specific screen image (operational mode selecting screen image) on the display unit, from among a plurality of operation buttons arranged in the vicinity of the display unit. The present invention also relates to an electronic device and an image forming apparatus provided with such an operation console.

Description of the Background Art

As one type of image processing apparatuses as electronic equipment, image forming apparatuses forming images on recording paper (typically, copy machines) are introduced to many places of business (companies and offices). In such a place of business, it has become increasingly common to connect an image forming apparatus having a printer function or a copy function to a network, to allow use (sharing) by a plurality of users. A multifunction peripheral (MFP) as one type of such image forming apparatuses has a plurality of basic operational modes such as a copy mode, a facsimile mode (hereinafter "facsimile" may also be denoted as FAX or fax), a network-supported printer mode and a scanner mode. In such an image forming apparatus, each user selects an operational mode and selects and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results on a sheet of recording paper. In such a situation, the operation panel, serving as an operation and display unit, functions as an interface between the image forming apparatus and the user. Generally, on the operation panel, a screen image for setting functions in each operational mode is displayed, so that the user can easily set various functions. Further, while a job is being executed, job progress status may be displayed, to allow the user to easily grasp the progress status of the job. In the printer mode executed upon reception of data from an external device, the job progress status may be displayed on the operation panel in accordance with the data received from the external device as a source.

Recently, a touch-panel display having a touch-panel formed on a liquid crystal panel (display panel) comes to be increasingly used as such an operation panel. By way of example, items (software buttons) allowing selection of a mode of the image forming apparatus are displayed on the touch-panel display, the user viewing the display presses a position of an item displayed on the touch-panel display (presses a software button), and the operational mode is set.

Such a touch-panel display having both the display and operation functions is advantageous in that it eliminates the necessity of providing a display unit and an operation unit separately. Further, it attracts attention recently since a command can be selected advantageously in accordance with the user's sense, when it is adapted such that a command can be selected in accordance with a trajectory of pressing of the touch-panel display by the user's finger. Examples of such command selection using finger trajectory include the following.

When a plurality of pages are displayed on the touch-panel display as print previews, the following operations may be performed. By a user operation of lightly tapping twice (hereinafter also referred to as double-tapping) a position of a certain page displayed as a preview, a command to display the page in an enlarged or reduced size can be selected. By a user operation trajectory of expanding a space between two fingers (hereinafter also referred to as pinch-out or pinch-open), a command to display the page in an enlarged size can be selected, and by a user operation trajectory of reducing a space between the two fingers (hereinafter also referred to as pinch-in or pinch-close), a command to display the page in a reduced size can be selected. In the following, these operations are denoted as gesture operations. The gesture operations are not limited to the above, and may include: tapping, or lightly touching an item displayed on the touch-panel display; dragging, or sliding an item with a finger; flicking, or lightly sweeping an item to scroll; and pinching with two fingers. It is noted that, strictly speaking, (different from other gesture operations) tapping and double-tapping are not determined by detecting the user operation trajectory on the touch-panel display. These are determined not by the trajectory but by detection of a position. Considering the relation to other gesture operations, in the present specification, the gesture operation generally refers to an operation for detecting a user request based on the operation trajectory of the user to the touch-panel display, including tapping and double tapping.

Further, in the present specification, an operation other than the gesture operations as such will be described as a touch operation. The touch operation means an operation of detecting a user's request based on the position of operation by the user on the touch-panel. A representative example of the touch operation is an operation of the user pressing a position of an item (pressing a software button) displayed on the touch-panel display.

In an MFP provided with a touch-panel display allowing both touch operation and gesture operation, many pieces of information intended for the user are displayed on the touch-panel display. Such an MFP has a plurality of operational modes as described above, and the user selects an operational mode. An operational mode may be selected by pressing a software button displayed on the touch-panel display, or by pressing a hardware button.

By way of example, Japanese Patent Laying-Open No. 2006-201585 (hereinafter referred to as '585 Reference)

discloses an operation panel device intended for improving operability by preventing operation error of any user. The operation panel device has a display unit on which an operation screen image can be displayed. The display unit of operation panel device provides color displays of a plurality of operation menu screen images, with background colors made different from each other.

In the operation panel device, the display unit is capable of color display of a plurality of operation menu screen images of respective operation menus, with background colors made different from each other. The user, noticing the background color of the operation menu screen image color-displayed on the display unit, can intuitively grasp the operation menu corresponding to the operation menu screen image. No matter who the user is, operation error in selecting the operation menu can be reduced, and improved operability can be attained. In FIG. 1 of '585 Reference, a group of function switching keys including four keys to switch among the copy function, printer function, scanner function and facsimile function is arranged as software buttons, aligned on the right side of the touch-panel display.

Japanese Patent Laying-Open No. 2006-308831 (hereinafter referred to as '831 Reference) discloses an image forming apparatus including a plurality of processing functions (copy function, facsimile function, scanner function, electronic mail function, etc.), that improves user operability by controlling screen image transitions.

The image forming apparatus includes: a display unit, displaying a menu screen image allowing selection of any of the plurality of processing functions, or a function instruction screen image allowing execution of a processing function; an operation unit, receiving a user operation related to the selected processing function, based on the screen image displayed on the display unit; a detection unit detecting absence of any operation, related to the selected processing function, on the operation unit for a prescribed time period; and a control unit, returning, if it is detected by the detecting unit that no operation is done for the prescribed time period, the screen image on the display unit to an initial display of the function instruction screen image related to the selected processing function.

The image forming apparatus is controlled such that, if no operation is done by the operation unit for a prescribed time period, the detecting unit detects the absence of operation, the function instruction screen image related to the processing function displayed on the display unit is reset, and the display is returned to the initial screen image of the function instruction screen image. Therefore, as an automatic reset process that takes place after the lapse of the prescribed time period, the initial screen image corresponding to the function that has been selected immediately before is resumed. Therefore, when the user is to proceed to the next process, the process function can readily be executed. FIG. 3(a) of '831 Reference shows software buttons for switching among the copy function, scanner function and facsimile function, on the touch-panel display.

SUMMARY OF THE INVENTION

Various electronic devices as represented by the image forming apparatus and an image processing apparatus include a touch-panel display as a display device. As disclosed in the references described above, various pieces of information are displayed on the touch-panel display. The image forming apparatus as one of such electronic devices has a plurality of functional modes or process functions (operational modes). When a user selects an operational mode, an initial screen image corresponding to the selected operational mode is displayed on the touch-panel display.

In the operation panel device disclosed in '585 Reference, the operational mode is selected using a hardware button. In the operation panel device as such, it is necessary to provide hardware buttons at least same in number to the types of operational modes. The operation panel device disclosed in '585 Reference is provided with a large number of hardware buttons including ten keys, a start key and a reset key, in addition to the operational mode selecting buttons corresponding to the four different operational modes. Therefore, a user may be confused in determining which hardware button is to be pressed for selecting an operational mode. Further, in the operation panel device disclosed in '585 Reference, four keys for switching among the copy function, printer function, scanner function and facsimile function are arranged aligned on the right side of touch-panel display. Such arrangement is not very easily viewable to the user, possibly leading to an error of selecting an operational mode.

Buttons for selecting operational modes come to be implemented by software buttons displayed on the touch-panel display, rather than the hardware buttons. Software buttons are preferred since the arrangement and shape (size) can easily be changed. By way of example, it is easy to display the software button in a larger size or in different color to be more easily noticeable by the user. In the image forming apparatus disclosed in '831 Reference, software buttons for switching operational modes are displayed on the touch-panel display.

However, '831 Reference does not sufficiently disclose the user operation for making a transition to the menu screen image allowing selection of an operational mode. What is disclosed in '831 Reference is simply that transition to the auto reset mode occurs in the absence of any operation for a prescribed time period after selection of an operational mode, and that the screen image after transition to the auto reset mode may be set either to the menu screen image or to the initial screen image of the selected operational mode.

Such a configuration may lead to the following problem. Assume that the user selects the copy mode as the operational mode, and is making various settings of the copy mode on the initial screen image of the copy mode. Here, it is often the case that the user has difficulty in operation and wishes to start the operation again from the selection of operational mode. However, it is difficult in the image forming apparatus disclosed in '831 Reference for the user to operate the image forming apparatus smooth in such a situation. The reason is as follows. First, it is necessary to set in advance the screen image after transition to the auto reset mode to the menu screen image. Further, in order to return to the menu image if the user is confused in operation, the user must wait without any operation until auto reset starts. This prevents smooth operation by the user of the image forming apparatus.

In order to avoid such a situation, an image forming apparatus having a hardware button forcing the screen image on the touch-panel display to make a transition to the menu screen image has been known. Even in such an apparatus, it is often the case that a large number of hardware buttons are arranged on the operation panel as in the case of '585 Reference, and the user having difficulty in operation could be confused, not knowing which hardware button should be pressed to return to the menu image. In that case, the user who wishes to return to the menu screen image may take a long time for operation, or may make an erroneous operation.

As a solution to such a problem, it is possible to provide only one hardware button to return to the menu screen image on the operation panel. In such an image forming apparatus, however, at least a power button and a button to enter/return to the energy-saving mode, which cannot be implemented by the software buttons displayed on the touch-panel display, must be provided. Therefore, it is not practical to provide only the hardware button to return to the menu screen image on the operation panel. When a plurality of hardware buttons are provided on the operation panel, the problem that the user may be confused in selecting which hardware button to be pressed cannot be solved. This problem is particularly significant if a large number of hardware buttons are provided in the vicinity of the touch-panel display.

Therefore, it is preferred to provide, in an electronic device and an image processing apparatus that operate in accordance with a user operation, an operation console allowing the user to accurately select and operate a hardware button receiving a request to make a transition to the screen image displaying specific information, from among a plurality of hardware buttons provided in the vicinity of the display unit.

The electronic device may be any device capable of operating in a plurality of operational modes, switched by a user operation. An example of the image processing apparatus is an image forming apparatus. The screen image to which the transition is made upon pressing the hardware button is, for example, a screen image allowing selection of an operational mode.

According to an aspect, the present invention provides an operation console used in relation to an apparatus as an object of control operated by a user operation. The operation console includes: a display device having a display area for displaying information to the user; an input device for the user to input a request; and a display control device displaying, if a request for displaying specific information on the display device is input through the input device, the specific information on the display device. The input device includes a plurality of operation buttons for inputting a plurality of requests, corresponding to respective requests, arranged in the vicinity of the display area of the display device, and among the plurality of operation buttons, an operation button corresponding to the request for displaying the specific information is provided closest to the display device.

The operation console is provided with a plurality of operation buttons (hardware buttons) as the input device, in the vicinity of the display area. If a user has difficulty in operation and wishes to have specific information displayed on the display device, the user inputs a request to display the specific information, by operating a specific operation button among the plurality of operation buttons. The specific operation button is provided in the vicinity of the display area and closest to the display area and, therefore, the user viewing the display area can easily and accurately select the specific button from the plurality of operation buttons. Therefore, the user request can easily and accurately be input, and the specific information can be displayed on the display device. Particularly, since the specific information (such as initial screen image information, help information, or mode selection information) can easily and accurately be displayed to the user having difficulty in operation, the user can avoid further trouble or difficulty.

The operation console is provided on an apparatus as an object of control operating in an operational mode selected by a user operation from among a plurality of operational modes. The specific information may be mode selection information allowing selection of one operational mode from the plurality of operational modes.

In this manner, if the user is making various settings in an operational mode once selected, and has difficulty in operation and wishes to restart from the selection of operational mode, the user may have the mode selection information displayed easily and accurately.

The shape of display area of the display device of operation console is substantially a rectangle in landscape orientation. The operation button corresponding to the request for displaying the specific information is provided on a first area adjacent to one side of the rectangle, and the operation buttons other than the operation button corresponding to the request for displaying the specific information are provided on a second area adjacent to another side different from the one side. The operation buttons provided on the second area may be larger in number than the operation button or buttons provided on the first area. In the first area, in addition to the operation button corresponding to the request for displaying the specific information, a few operation buttons including an operation button for operating power supply or/and an operation button controlling energy saving, may be provided.

In the second area, buttons other than the operation button corresponding to the request for displaying the specific information are provided collectively. Since the plurality of operation buttons are provided collectively, the flow line of user's fingertip does not wastefully move to the left/right or upward/downward. In the first area, only the operation button corresponding to the request for displaying the specific information, or only a few operation buttons including the operation button are provided (the number of few operation buttons here is smaller than the number of operation buttons provided in the second area) and, therefore, the operation button corresponding to the request for displaying the specific information is highly noticeable. Thus, visibility to the user is improved and operability is also improved, so that erroneous operation can be prevented.

The one side of the display area may be a shorter side of the rectangle, and another side may be the other shorter side of the rectangle.

The operation buttons are arranged in the vicinity of the display area, next to two shorter sides with the display device positioned therebetween. Since positions where the operation buttons are arranged are apart from each other, the operation buttons can be distinguished from each other, and user operability is improved. Since there is only one or only a few operation buttons arranged in the first area, the user can easily and accurately find the operation button corresponding to the request for displaying the specific information.

The one side of the display area may be a longer side of the rectangle, and another side may be a shorter side of the rectangle.

In the first area adjacent to the longer side, the operation button corresponding to the request for displaying the specific information and possibly few other buttons are provided, while in the second area adjacent to the shorter side, large number of other operation buttons are provided. Specifically, the operation buttons are arranged in the vicinity of display area, adjacent to different sides. Since positions where the operation buttons are arranged are apart from each other, the operation buttons can be distinguished from each other, and user operability is improved. Since there is only one or only a few operation buttons arranged in the first area (adjacent to the longer side of the rectangle), the user can easily and accurately find the operation button corresponding to the request for displaying the specific information.

The one side of the display area adjacent to the first area may be a shorter side of the rectangle, and another side may be a longer side of the rectangle.

The one side of the display area adjacent to the first area may be a longer side of the rectangle, and another side may be a shorter side of the rectangle.

Preferably, the shape of the operation button corresponding to the request for displaying the specific information is a rectangle, and the operation button corresponding to the request for displaying the specific information is arranged with one side of the rectangle positioned parallel to one side of the rectangle of the display area.

The operation button corresponding to the request for displaying the specific information may be arranged adjacent to a first corner of the rectangle of the display area, and the operation buttons provided on the second area may be arranged adjacent to a second corner diagonally opposite to the first corner of the rectangle of the display area.

According to another aspect, the present invention provides an electronic device provided with the operation console described above. According to a still further aspect, the present invention provides an image processing apparatus provided with the above-described operation console.

In the electronic device and the image forming apparatus, it is possible for the user to accurately select and operate the operation button for causing a transition to a screen image allowing selection of an operational mode of the electronic device or the image forming apparatus (image forming apparatus), from a plurality of operation buttons.

According to the present invention, in the electronic device and the image forming apparatus operated by a user (operated, for example, switched among a plurality of operational modes), it is possible for the user to accurately select and operate the hardware button receiving a request to make a transition to the screen image displaying specific information (for example, a screen image allowing selection of an operational mode), from a plurality of hardware buttons provided in the vicinity of the display unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
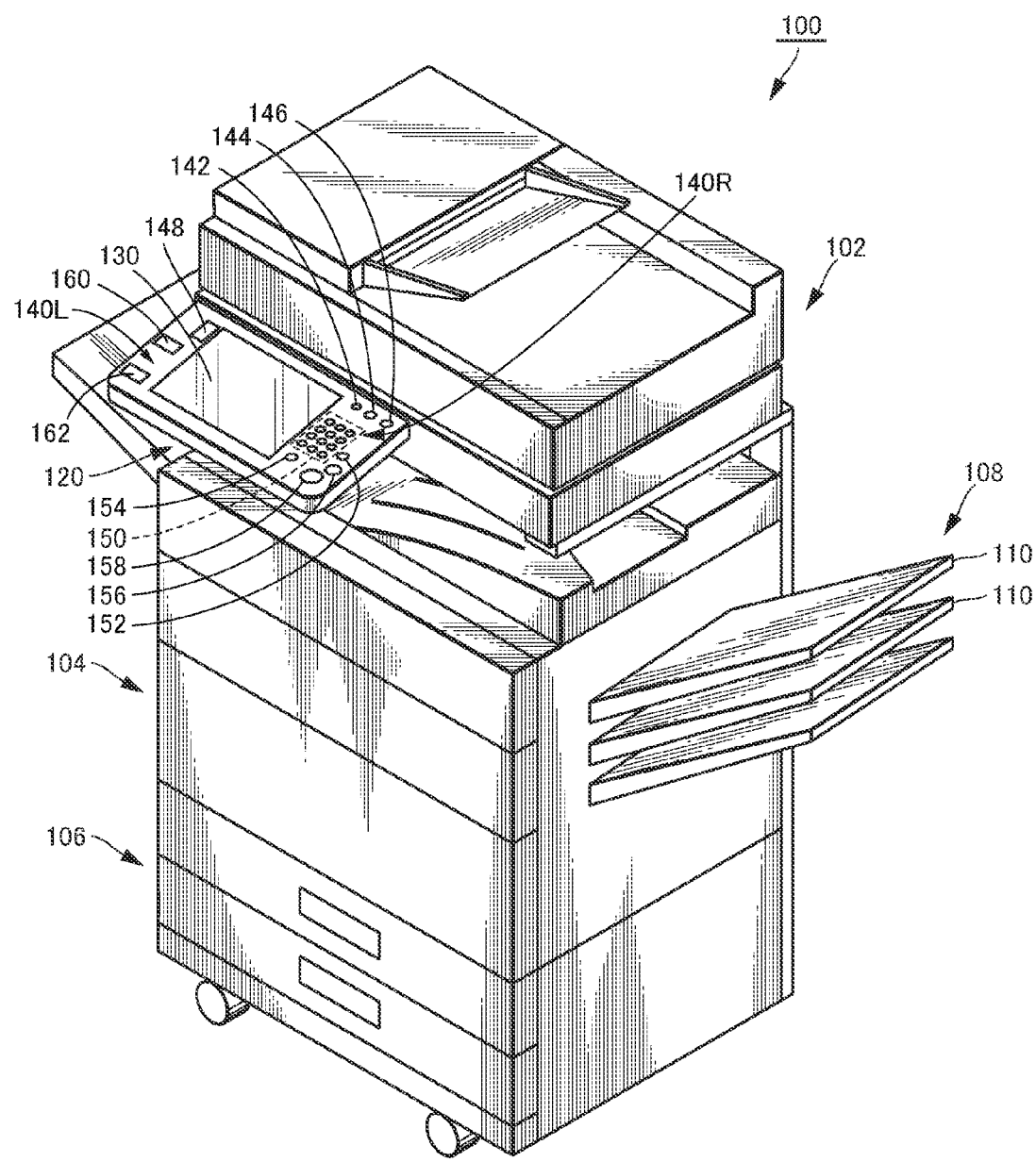
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

The electronic device in accordance with an embodiment of the present invention is an image forming apparatus as one type of image processing apparatuses. The display device in accordance with the present invention may be applicable to an image processing apparatus or an electronic device other than the image forming apparatus. The electronic device in accordance with the present embodiment may be any apparatus having a plurality of operational modes and provided with an operation console capable of displaying a specific screen image (menu screen image (home screen image), help screen image, initial screen image etc.), for switching the operational mode, by pressing one hardware button among a plurality of hardware buttons. Here, the specific screen image displayed on the operation console is not limited to the home screen image.

The image forming apparatus 100 in accordance with the present embodiment includes a touch-panel display allowing operation by the gesture operation method and the touch-operation method not using the gesture operation. The apparatus, however, may include a touch-panel display allowing touch operation only. Alternatively, the apparatus may include a display panel, capable of display only and not allowing any operation, and buttons for operation.

The image forming apparatus forms an image on a sheet of recording paper by electro-photography. The image forming apparatus includes, as operational modes, copy mode, FAX mode, document filing mode (a mode in which a scanned image is stored in a storage device in the image forming apparatus) and mail mode (a mode in which a scanned image is transmitted attached to an electronic mail). The image forming apparatus may further include network printer mode. The present invention is not limited to the above, and it may be any image forming apparatus including at least two of the four operational modes, that is, copy mode, FAX mode, document filing mode and mail mode, in which a home screen image allowing selection of an operational mode is displayed on the touch-panel display when a specific button among the plurality of hardware buttons is pressed. Further, the printing method is not limited to electro-photography.

Image Forming Apparatus: Function

Figure 2:
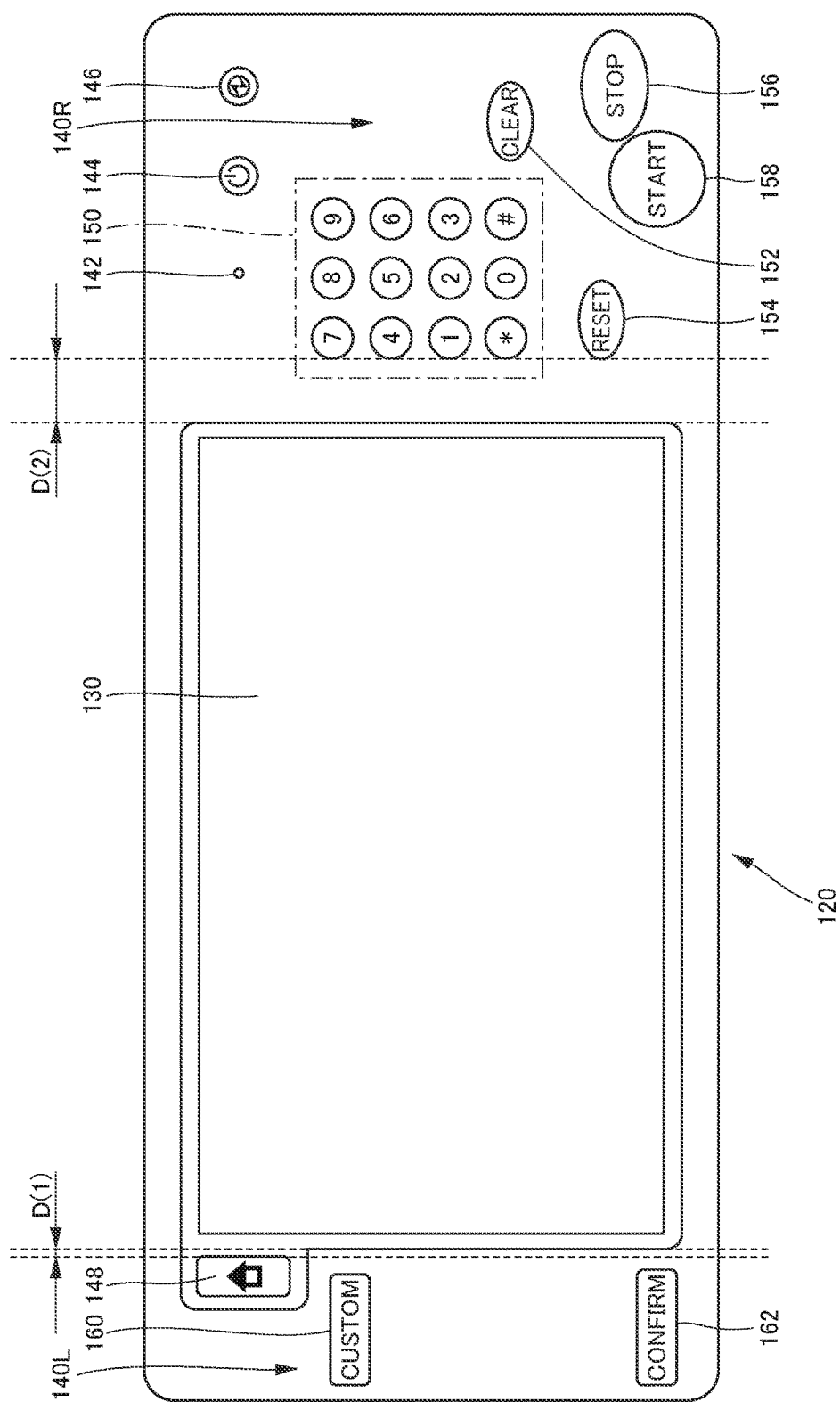
FIG. 2 is a plan view of an operation unit of the image forming apparatus shown in FIG. 1.
Figure 3:
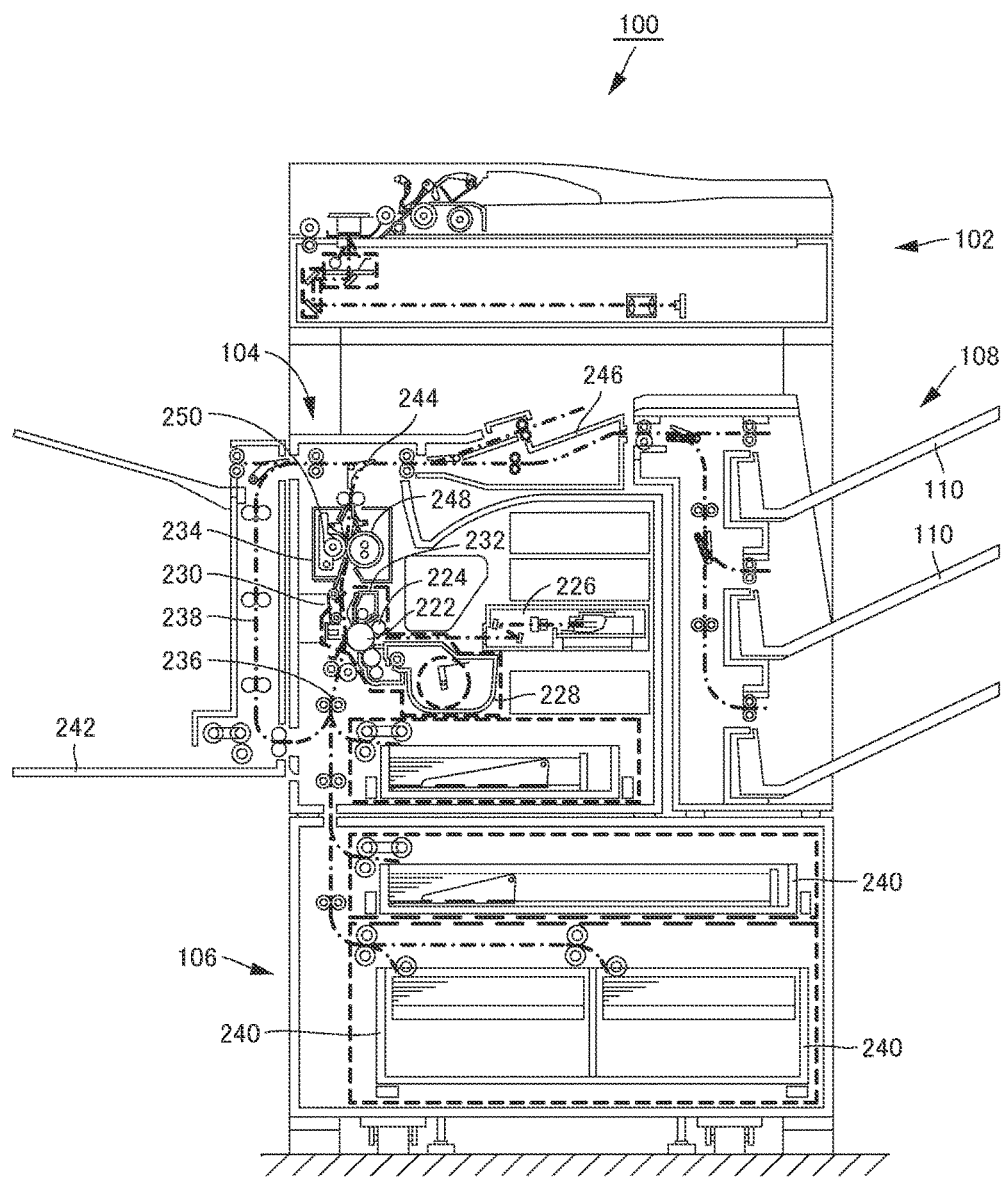
FIG. 3 schematically shows an internal configuration of the image forming apparatus shown in FIG. 1.
Figure 4:
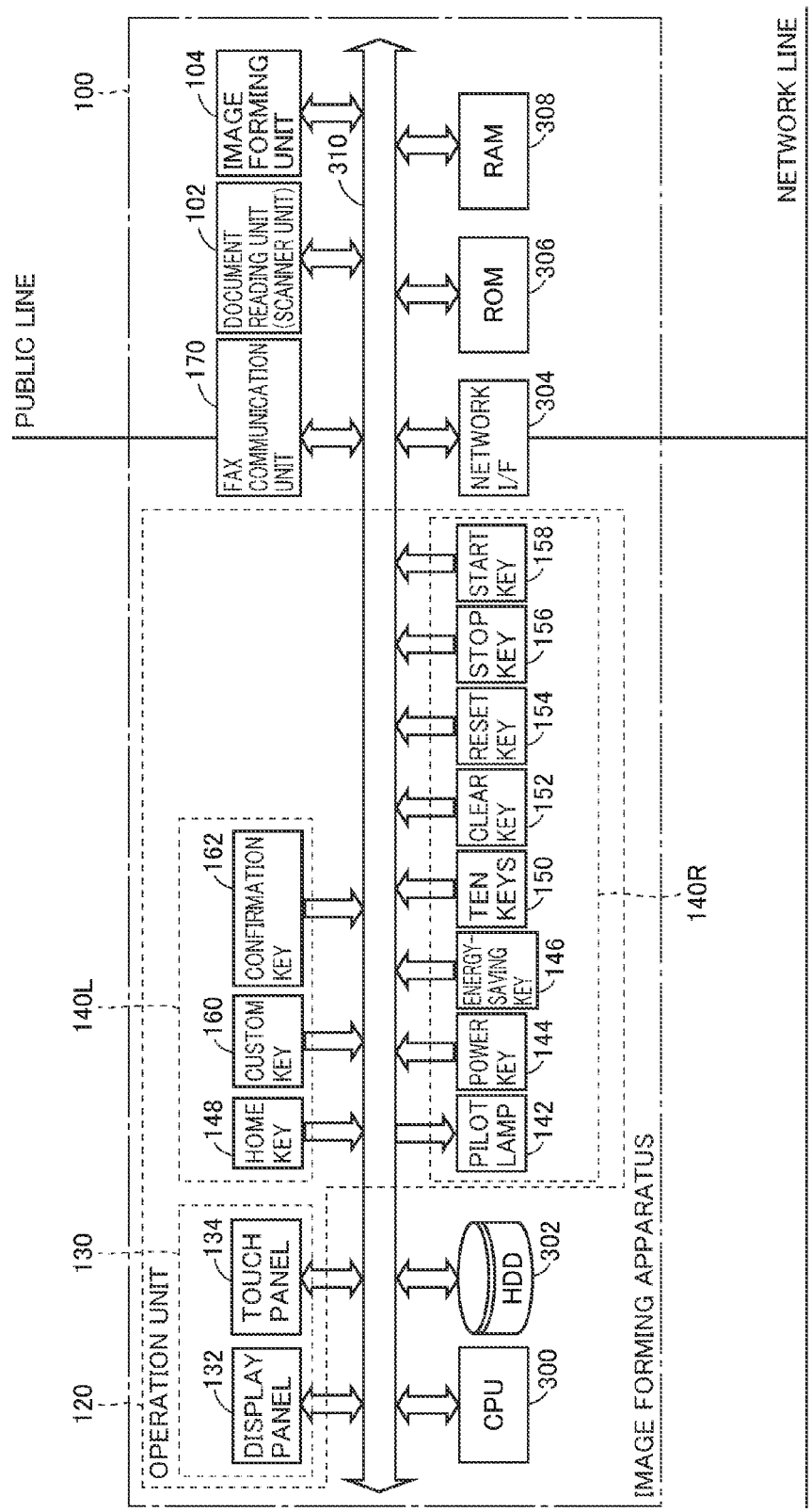
FIG. 4 is a functional block diagram showing a hardware configuration of the image forming apparatus shown in FIG. 1.

Referring to FIGS. 1 to 4, an image forming apparatus 100 in accordance with the present embodiment will be described. FIG. 1 shows an appearance of an image forming apparatus 100. FIG. 2 is a plan view of an operation unit of image forming apparatus 100. FIG. 3 schematically shows an internal configuration of image forming apparatus 100. FIG. 4 is a functional block diagram of image forming apparatus 100.

Referring to FIGS. 1 to 4, image forming apparatus 100 includes a document reading unit 102, an image forming unit 104, a paper feed unit 106, a paper discharge unit 108 and an operation unit 120. As shown in FIGS. 1 and 2, operation unit 120 includes: a touch-panel display 130 having a rectangular display surface of landscape orientation when viewed from the front side of the apparatus; a right-side display operation unit 140R arranged on the right side of touch-panel display 130; and a left-side display operation unit 140L arranged on the left side of touch-panel display 130. Touch-panel display 130 includes a display panel 132 formed of a liquid crystal panel or the like, and a touch-panel 134 arranged on display panel 132, for detecting a position pressed by the user's finger. Right-side display operation unit 140R includes a pilot lamp 142, a power key 144, an energy-saving key 146, ten keys 150, a clear key 152, a reset key 154, a stop key 156, and a start key 158. Left-side display operation unit 140L includes a home key 148 for returning the display screen image on touch-panel display 130 to a home screen image for selection of an operational mode, a custom key 160 for calling a customization process for changing the manner of display on touch-panel display 130, and a confirmation key 162 for inputting confirmation. The hardware buttons provided on image forming apparatus 100 are not limited to such hardware buttons (custom key 160, confirmation key 162 and the like).

As described above, image forming apparatus 100 in accordance with the present embodiment is provided with touch-panel display 130 as a main operation device, and, in addition, with right-side display operation unit 140R and left-side display operation unit 140L, including hardware buttons and a pilot lamp. The keys (power key 144, energy-saving key 146, home key 148, ten keys 150, clear key 152, reset key 154, stop key 156, start key 158) of right-side display operation unit 140R or left-side display operation unit 140L are hardware buttons, in contrast to the software buttons realized by touch-panel display 130. It is noted that image forming apparatus 100 is not limited to one having right-side display operation unit 140R and left-side display operation unit 140L having such configurations. The right-side display operation unit 140R and left-side display operation unit 140L may be any unit having a plurality of hardware buttons in the vicinity of touch-panel display 130, in which a home screen image is displayed on touch-panel display 130 (on which the home screen image has not been displayed), when home key 148 among the plurality of hardware buttons is pressed. When the user selects an operational mode using the home screen image displayed on touch-panel display 130, the display is switched to the initial screen image in the selected operational mode. In the following, operational modes of image forming apparatus 100 as such will be described.

Copy Mode

In the following, an operation in the copy mode will be described. In the copy mode, mainly document reading unit (also referred to as a scanner unit) 102 and image forming unit 104 operate.

In image forming apparatus 100, a document placed on a platen is read by document reading unit 102 as image data. The read image data is input to CPU 300 implemented, for example, by a microcomputer shown in FIG. 4. The image data is subjected to various image processing operations here, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy-saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

Facsimile Mode

In the following, an operation in the facsimile mode will be described. In the facsimile mode, the transmission operation is realized mainly by the operation of document reading unit (scanner unit) 102 and FAX communication unit 170, and the reception operation is realized mainly by the operation of FAX communication unit 170 and image forming unit 104.

Transmission Operation

In image forming apparatus 100, the facsimile mode is designated. A document placed on the platen is read by document reading unit 102 as image data. The read image data is input to CPU 300 implemented, for example, by a microcomputer shown in FIG. 4, the image data is subjected to various image processing operations here, and the resulting image data is output to a FAX communication unit (FAX communication unit 170 of FIG. 4).

FAX communication unit 170 of image forming apparatus 100 on the transmitting side connects a designated transmitting side line to a designated transmission destination. FAX communication unit 170 converts the image data to communication data in compliance with facsimile transmission standard, and transmits the converted data to a facsimile machine (such as an image forming apparatus 100 having the facsimile function) on the receiving side.

Communication Operation

When the line is connected, a FAX communication unit 170 of image forming apparatus 100 on the receiving side detects a communication request signal from FAX communication unit 170 of image forming apparatus 100 on the transmitting side, and transmits an acknowledgement signal. Thereafter, by way of example, FAX communication units 170 on the transmitting and receiving sides pass performance information supported by transmitting side and receiving side, determine highest possible speed of communication and method of coding and code correction of image data, and set the method of communication of modems. Then, using the image signal format in compliance with the communication method, data is transmitted from FAX communication unit 170 of image forming apparatus 100 on the transmitting side to the FAX communication unit 170 of image forming apparatus 100 on the receiving side. When transmission ends, the line is disconnected.

Reception Operation

FAX communication unit 170 of image forming apparatus 100 on the receiving side converts the received data to image data and passes the data to an image forming unit 104. The received data may be converted to image data at the image forming unit 104. The image forming unit 104 prints an image of a document represented by the image data converted from the received data on a sheet of recording paper, in a manner similar to the operation in the copy mode described above.

Document Filing Mode

In the following, an operation in the document filing mode will be described. In the document filing mode, mainly document reading unit (scanner unit) 102 and image forming unit 104 operate.

In image forming apparatus 100, a document placed on the platen is read by document reading unit 102 as image data. The read image data is input to CPU 300 and subjected to various image processing operations here. The resulting image data is stored in a storage device (hard disk drive 302 as will be described later) provided in image forming apparatus 100.

The stored image data is read from the hard disk drive by the user designating the file name, and printed on a sheet of recording paper in the similar manner as in the copy mode described above.

Mail Mode (Scan-to-Mail)

In the following, description will be given on an operation in the mail mode. In the mail mode, document reading unit (scanner unit) 102 and network interface 304 mainly operate.

The image communication mode provided in image forming apparatus 100 includes the facsimile mode in which image data is transmitted/received by public line through FAX communication unit 170, and the electronic mail communication mode (mail mode) in which the image data is transmitted/received by the Internet line in the form of an attachment to an electronic mail, through network interface 304. Image forming apparatus 100 may further include Internet facsimile mode in which the image data is transmitted/received by the Internet line through network interface 304, or image transfer mode (scan-to-PC folder) in which the image data is transferred to a folder of a specific personal computer (PC) using a network line.

In image forming apparatus 100, a document placed on a platen is read by document reading unit 102 as image data. The read image data is input to CPU 300, and subjected to various image processing operations here. The resulting image data is transmitted, attached to an electronic mail.

Different from the facsimile mode in which a telephone number of transmission destination is designated, a mail address of the transmission destination is designated in the mail mode.

Image Forming Apparatus: Control Block Configuration

Referring to FIG. 4, image forming apparatus 100 further includes operation unit 120, which allows setting of functions related to the copy mode, facsimile mode, document filing mode and mail mode; ROM (Read Only Memory) 306, which stores programs and the like; a hard disk drive (hereinafter denoted as HDD) 302, which is a non-volatile storage area capable of storing programs and data even when power is cut off; and an RAM (Random Access Memory) 308, which provides a storage area when a program is executed.

Image forming apparatus 100 further includes: a bus 310 connected to document reading unit 102, image forming unit 104, FAX communication unit 170, operation unit 120, ROM 306, HDD 302, and RAM 308; and CPU 300 connected to bus 310, executing a program or programs for realizing general functions as the image forming apparatus.

HDD 302 stores files of image data of documents scanned by image forming apparatus 100, folder by folder, together with date and time of saving and name of the user who saved. Further, HDD 302 stores initial screen image data of each operational mode.

ROM 306 stores programs and data necessary for controlling operations of image forming apparatus 100. The initial screen image data of each operational mode may be stored as data to be stored together with the program in ROM 306. CPU 300 controls image forming apparatus 100 in accordance with the programs and data stored in ROM 306, and executes control related to various functions of image forming apparatus 100.

As shown in FIG. 4, a public line is connected for transmitting/receiving image data, to FAX communication unit 170 of image forming apparatus 100. To network interface 304, a network line is connected. To the network line, a computer or the like using image forming apparatus 100 as a network-supported printer may be connected. To the network line, a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102; image forming unit 104; touch-panel display 130, right-side display operation unit 140R and left-side display operation unit 140L forming operation unit 120; ROM 306; HDD 302; and RAM 308; by executing a prescribed program or programs. Operation unit 120 communicates with CPU 300 through an input/output interface (not shown).

Operation unit 120 includes a plate-shaped panel provided in an inclined manner to be easily viewable by the user. On a surface of operation unit 120, touch-panel display 130 is provided on the central area. On the right side of touch-panel display 130, right-side display operation unit 140R (pilot lamp 142 and power key 144, energy-saving key 146, ten keys and the like as hardware buttons) is arranged, and on the left side of touch-panel display 130, left-side display operation unit 140L (home key 140, custom key 160 and confirmation key 162) is arranged. Touch-panel display 130, right-side display operation unit 140R and left-side display operation unit 140L are integrated and as a whole, form operation unit 120.

As described above, touch-panel display 130 is formed of display panel 132 and touch-panel 134 arranged on display panel 132. On display panel 132 of touch-panel display 130, a home screen image allowing selection of an operational mode of image forming apparatus 100, current state of image forming apparatus 100, status of destination designation, and status of job processing are displayed. On a display area of display panel 132, selection buttons as software buttons are displayed. When a portion where the selection button is displayed is pressed, the pressed position is detected by the touch-panel 134. By comparing the display position of the selection button and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 142 of right-side display operation unit 140R is, for example, an LED (Light Emitting Diode). It is turned on/off/flickered under the control of CPU 300. When the user presses power key 144 provided separate from a main power switch, image forming apparatus 100 makes a transition from a standby mode (operational mode in which, for example, only the FAX receiving operation is possible with the main power on) to a normal mode, in which every operational mode of image forming apparatus 100 is usable. In this state, pilot lamp 142 is turned and kept on. If a predetermined time passes without any user operation on image forming apparatus 100, or if the user presses energy-saving key 146, image forming apparatus 100 makes a transition from the normal mode to the energy-saving mode. In the energy-saving mode, only some of the operational modes of image forming apparatus 100 can be used. In this state, pilot lamp 142 flickers. Further, if the user presses energy-saving key 146 in the energy-saving mode, the image forming apparatus 100 makes a transition from the energy-saving mode to the normal mode. Home key 148 is a hardware key for returning the display of touch-panel display 130 to the initial state (home screen image). The processes performed when power key 144, energy-saving key 146 and home key 148 are pressed are not limited to the above.

Referring to FIGS. 1 and 2, planar arrangement of operation unit 120 will be described in detail. Most part of the upper surface of operation unit 120 serves as the display area of rectangular touch-panel display 130. On the right, shorter side of touch-panel display 130, right-side display operation unit 140R is provided and on the left, shorter side of touch-panel display 130, left-side display operation unit 140L is provided.

As shown in FIG. 2, the appearance of home key 148 has the following characteristics: (1) it is arranged closer to touch-panel display 130; and (2) it has a rectangular shape in portrait orientation. Home key 148 may preferably made integral with the box portion covering touch-panel display 130. Further, the size of home key 148 (area projected on the upper surface of operation unit 120) may be made larger than other hardware buttons.

Because of the characteristic shape (2), the length of that portion of home key 148 which is adjacent to the shorter side of touch-panel display 130 can be made longer, and hence integrity with the touch-panel display 130 can be enhanced. Specifically, assuming that the display surface of touch-panel display 130 is in the landscape orientation when viewed from the front side of the apparatus, if home key 148 is provided on the left or right side of touch-panel display 130, home key 148 is adapted to have a rectangular shape in portrait orientation. In this arrangement, one longer side of the rectangle of home key 148 comes next to a shorter side of touch-panel display 130. If home key 148 is provided on the upper or lower side of touch-panel display 130, home key 148 is adapted to have a rectangular shape in landscape orientation. In this arrangement, one longer side of the rectangle of home key 148 comes next to a longer side of touch-panel display 130. This enhances integrity with touch-panel display 130. An approach to enhance integrity is to design a member (a box, a line, or a member of rugged surface surrounding peripheral edges of touch-panel display 130) such that it is arranged around the peripheral edge of rectangular touch-panel display 130 and protruded near home key 148, to enclose home key 148. By such a design, oneness of touch-panel display 130 and home key 148 can effectively be appealed to the user, relation between the devices (display device and operation device) is recognized, and hence, pressing of home key 148 is encouraged.

Further, the entire upper surface of operation unit 120 is of achromatic color (black). This is preferred since the state of pilot lamp 142 indicating the status of image forming apparatus 100 is easily recognizable, for example, in the energy-saving mode. Particularly if touch-panel display 130 is of a large size, measures to save energy is important and, therefore, at least power key 144 and energy-saving key 146 are provided separately as hardware buttons, so that the apparatus can be set to the standby state not allowing any operation. Since it is impossible to supply power partially to the display area of touch-panel display 130 (to partially render conductive), touch-panel display 130 turns black without any display in the energy-saving mode. In this respect, since the panel body of the upper surfaces of touch-panel display 130 and operation unit 120 is all black, pilot lamp 142 is better noticed.

Planar arrangement of home key 148 and other keys (power key 144, energy-saving key 146, ten keys 150 and the like) will be described. As shown in FIG. 2, distance D (1) between home key 148 and touch-panel display 130 is shorter than distance D (2) between ten keys 150 or reset key 154, which is closest to the touch-panel display 130 among other keys, to touch-panel display 130. Specifically, among the plurality of hardware buttons (keys), home key 148 is arranged closest to touch-panel display 130.

Though not limiting, as shown in FIG. 2, in image forming apparatus 100, the outer edge of ten keys 150 to the side of touch-panel display 130 and the outer edge of reset key 154 to the side of touch-panel display 130 are aligned.

In hardware buttons (power key 144, energy-saving key 146, start key 158 and the like) of right-side display operation unit 140R and in hardware buttons (home key 148 and the like) of left-side display operation unit 140L, a key lamp or key lamps, which is turned on/off or turned on/off/flickered under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

Image forming apparatus 100 in accordance with the present embodiment includes the four operational modes (copy mode, facsimile mode, document filing mode and mail mode) as described above. On touch-panel display 130, software buttons for setting functions in respective operational modes are displayed, and buttons for setting a destination or a preview as an expected image, for example, are displayed as needed.

In different operational modes, different screen images are displayed on touch-panel display 130. In order to allow the user to easily find a required piece of information even in such a state, touch-panel display 130 is divided into a plurality of areas (with the size of each area made variable), and pieces of information are displayed in these areas. More specifically, in image forming apparatus 100, if an operational mode is selected on the home screen image of touch-panel display 130 provided as a main display operation device, the initial screen image of each operational mode is displayed. The initial image has the following characteristics.

(1) The basic layout is such that the screen image is divided into five areas ("system area," "function selecting area," "preview area," "action panel area," and "task trigger area") and arranged appropriately. Therefore, by a user operation starting from an upper left portion to a lower right portion, easy setting is possible. The reason for this is that the flow lines of the user's viewpoint and finger tip are similar to those in a conventional device not provided with such a large touch-panel display 130.

(2) Concepts of the pieces of information displayed on respective ones of the five areas are common among different operational modes, so that smooth operation by the user without any confusion becomes possible even in different operational modes.

In the following, the arrangement of basic layout will be described.

Basic Layout Arrangement

Figure 5:
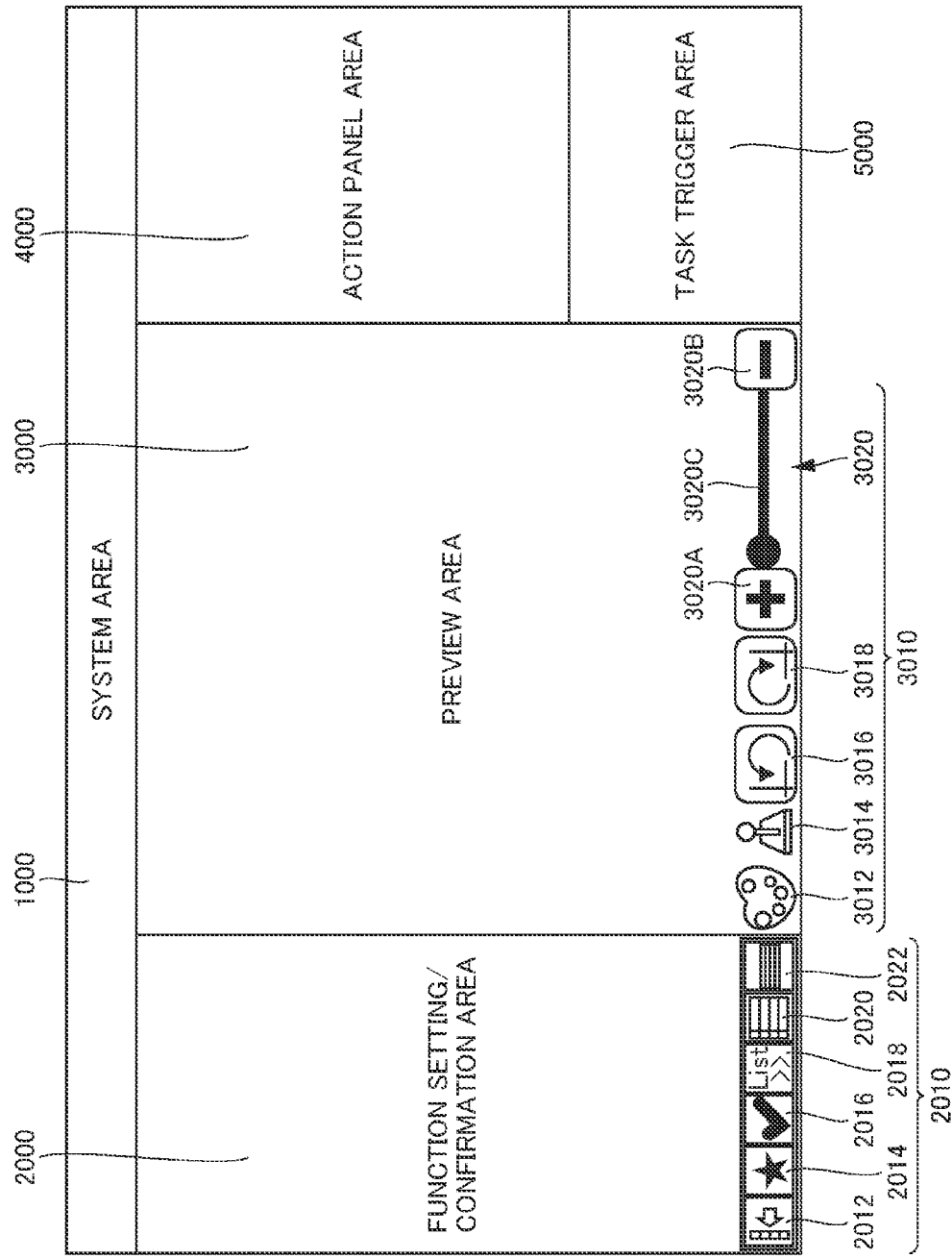
FIG. 5 shows display areas of a touch-panel display of the image forming apparatus shown in FIG. 1.

FIG. 5 shows a basic layout on touch-panel display 130 of image forming apparatus 100. Referring to FIG. 5, the basic layout of landscape-oriented touch-panel display 130 (for example, of 1024 pixels×600 pixels) includes: system area 1000 arranged at the uppermost portion; preview area 3000 arranged at the center of the screen image; function setting/confirmation area 2000 (hereinafter referred to as function selecting area 2000) placed on the left side of preview area 3000; action panel area 4000 placed on the right side of preview area 3000; and task trigger area 5000 placed on the lower right side of preview area 3000. The number of areas is not limited to five, the arrangement on the left and right sides is not limited to the above, and the layout may be customized to facilitate user operation. For instance, system area 1000 may be positioned at the lowermost portion of the screen image.

On system area 1000, pieces of information related to the current status, title of the operational mode that is being selected, and state of image forming apparatus 100 are displayed. By way of example, on system area 1000, an operational mode name, an interruption key, a log-in user name, status of a currently processed job, state of use of an internal memory, time and the like are displayed.

On function selecting area 2000, a function selection menu (icons, buttons and the like) operated by the user for setting each function, switching display and confirming setting, is displayed. The manner of display of function selecting area 2000 is changed depending on whether it is in an icon mode, a regular mode or an express mode. In the icon mode, only the icons for setting functions are displayed in function selecting area 2000, so as to ensure the widest preview area 3000. In the express mode, a large screen image allowing setting of functions at one time is displayed in function selecting area 2000, while preview area 3000 is made the smallest. In the regular mode, the size of preview area 3000 is medium size between that in the icon mode and that in the express mode. In function selecting area 2000, function names are displayed in text, together with the icons for setting functions.

Switching among the icon mode, regular mode and express mode is done based on an operation by the user. Specifically, the size of preview area 3000 is changed in accordance with the user's operation. Since icons can transmit pieces of information to the user in a small area, it is preferred to prepare icons for all functions, so as to allow display of preview area 3000 in a large size.

At a lower portion of function selecting area 2000, a group of change buttons 2010 are provided, for changing style of display of function selecting area 2000. Among the group of change buttons 2010, provided are: an icon mode entering button 2012 for displaying function selecting area 2000 in the icon mode; a "favorite" button 2014 for displaying functions registered as "favorites"; a check button 2016 for displaying a function of which setting has been changed; a list button 2018 for displaying a list of all functions that can be set in the selected operational mode; a regular mode entering button 2020 for displaying function selecting area 2000 in the regular mode; and an express mode entering button 2022 for displaying function selecting area 2000 in the express mode.

If a large amount of information is to be displayed on function selecting area 2000, pieces of information are displayed in an upward/downward scrollable manner. In that case, the group of change buttons 2010 are not scrolled but constantly displayed at the lowermost portion of function selecting area 2000.

In preview area 3000, an image of expected document output (finished form) is displayed. Specifically, an image is displayed using dummy data or scanned data. Every time the user designates the manner of finish, the image displayed on preview area 3000 changes. Preview area 3000 has two display modes, that is, a virtual mode before scanning, in which finished form of a dummy image is displayed, and a scan-in mode after scanning, in which finished form of the actual image is displayed. The virtual mode has two types, that is, before setting an original document and after setting an original document.

At a lower portion of preview area 3000, a group of preview changing buttons 3010 are arranged, for changing the style of display of preview area 3000. Among the group of preview changing buttons 3010, provided are: a left-turn button 3016 for turning the preview 90 degrees to the left; a right-turn button 3018 for turning the preview 90 degrees to the right; and a zoom bar 3020. In addition to these buttons, a color changing button 3012 and preview operation button 3014, for example, are provided.

When left-turn button 3016 is touch-operated once, the preview is turned 90 degrees to the left, and when touch-operated twice, the preview is turned 180 degrees to the left. Similarly, when the image of finished document displayed on the preview area is gesture-operated (when the document image is rotated 90 degrees or 180 degrees counterclockwise by one's finger), the preview is turned 90 degrees or 180 degrees to the left.

When right-turn button 3018 is touch-operated once, the preview is turned 90 degrees to the right, and when touch-operated twice, the preview is turned 180 degrees to the right. Similarly, when the image of finished document displayed on the preview area is gesture-operated (when the document image is rotated 180 degrees clockwise by one's finger), the preview is turned 180 degrees to the right.

When a plus button 3020A of zoom bar 3020 is touch-operated or if bar 3020C is gesture-operated (slid) to the side of plus button 3020A, the preview is displayed in an enlarged size. Similarly, when the image of finished document displayed on the preview area is gesture-operated (when the document image is pinched-out/pinched-open by finger tips), the preview is displayed in an enlarged size.

When a minus button 3020B of zoom bar 3020 is touch-operated or if bar 3020C is gesture-operated (slid) to the side of minus button 3020B, the preview is displayed in a reduced size. Similarly, when the image of finished document displayed on the preview area is gesture-operated (when the document image is pinched-in/pinched-close by finger tips), the preview is displayed in a reduced size.

If the number of pages of the document image to be displayed on preview area 3000 is large, a display page selection button (a page number input button, page feed button, page return button, single page display button, plural page display button or the like) that can be touch-operated may be displayed. Page feed and page return of the previewed document is also possible by a gesture-operation (flick) of the document image. If the document image displayed on preview area 3000 is large, a scroll bar that can be touch-operated or gesture-operated may be displayed.

On action panel area 4000, pieces of information related to assistance, guidance and suggestion related to the operation are displayed. On action panel area 4000, if, for instance, a user selects a specific function, functions related to the selected function may be displayed, other functions related to the selected function in object-oriented manner may be displayed, or functions selected in the past by the user or a user of a group to which the user belongs in relation to the selected function may be displayed as "recommended functions."

On task-trigger area 5000, trigger items operated by the user to actually operate image forming apparatus 100 when all settings are done for the operational mode are displayed. By way of example, a start button (software button) is displayed for starting a process. In an operational mode involving printing (other than facsimile transmission), information related to run out of consumables is also displayed on the "task trigger area," since it leads to a task failure.

Here, it is preferred to display the start button only when the state allows pressing of the start button. The state that allows pressing of the start button refers to a state in which all settings have been done, and consumables (recording paper and toner) are available, in the operational mode involving printing. In the facsimile mode (transmission) as an operational mode not involving printing, it is a state in which settings of all transmission parameters including a destination have been done.

The positions where these five areas are arranged are not changed even when the operational mode is changed (not changed in the initial screen image of any operational mode). Similar to the switched display in the icon mode/regular mode/express mode of function selecting area 2000 (and preview area 3000), the size of each area is changed, reduced/enlarged in the lateral direction (longitudinal direction) of touch-panel display.

These five areas are arranged in consideration of the flow line of user's viewpoint and the flow line of user's operation, in addition to the user interface of conventional devices. With such an arrangement, the user's viewpoint moves from upper left to lower right, and the user operation (finger tip of the dominant hand) moves from upper left to lower right. This advantageously enables a user-friendly operation.

For making a transition from one operational mode to another, home key 148 is pressed, to select another operational mode on the home screen image. In this manner, the operational mode is switched through the home screen image.

As described above, image forming apparatus 100 is provided with touch-panel display 130 on which the home screen image is displayed when home key 148 is pressed by the user. Such a display process is realized by software executed by using the hardware configuration described above.

Basically, no matter what screen image is displayed on touch-panel display 130, if it is detected that home key 148 is pressed, CPU 300 of image forming apparatus 100 executes the program of displaying the home screen image on touch-panel display 130. CPU 300 executes, in parallel with the program, a program for realizing general functions of an image forming apparatus. The program, however, is not directly related to the characteristic portion of the present invention and, therefore, details thereof will not be described here. It is also possible to change the manner of control of image forming apparatus 100 (particularly, the manner of control related to the display of touch-panel display 130) by pressing home key 148 for a long time or by pressing the key twice.

Operation

The operation of image forming apparatus 100 in accordance with the present embodiment based on the configuration and flowchart as above will be described with reference to the exemplary displays on touch-panel display 130 shown in FIGS. 6 and 7.

Home Screen Image Display Operation

When the user presses power key 144 of image forming apparatus 100, the warm-up screen image is displayed on touch-panel display 130 until warm-up is complete. At this time, it is preferred that image forming apparatus 100 prepares pieces of information that can be displayed even during system check and useful for the user who is going to use image forming apparatus 100, and that the warm-up screen image including such pieces of information is displayed on touch-panel display 130.

When warm-up is complete, the home screen image is displayed on touch-panel display 130. At this time, on touch-panel display 130, a home screen image 6000 such as shown in FIG. 6 is displayed. On home screen image 6000, not all of the five areas of the layout described above are displayed. As shown in FIG. 6, on home screen image 6000, icons (icons representing operational modes) allowing selection of an operational mode are displayed on most part of touch-panel display 130, regardless of the five areas. The number of icons to be displayed on home screen image 6000 may be customized, for example, in three stages, of "large," "middle" and "small."

Figure 6:
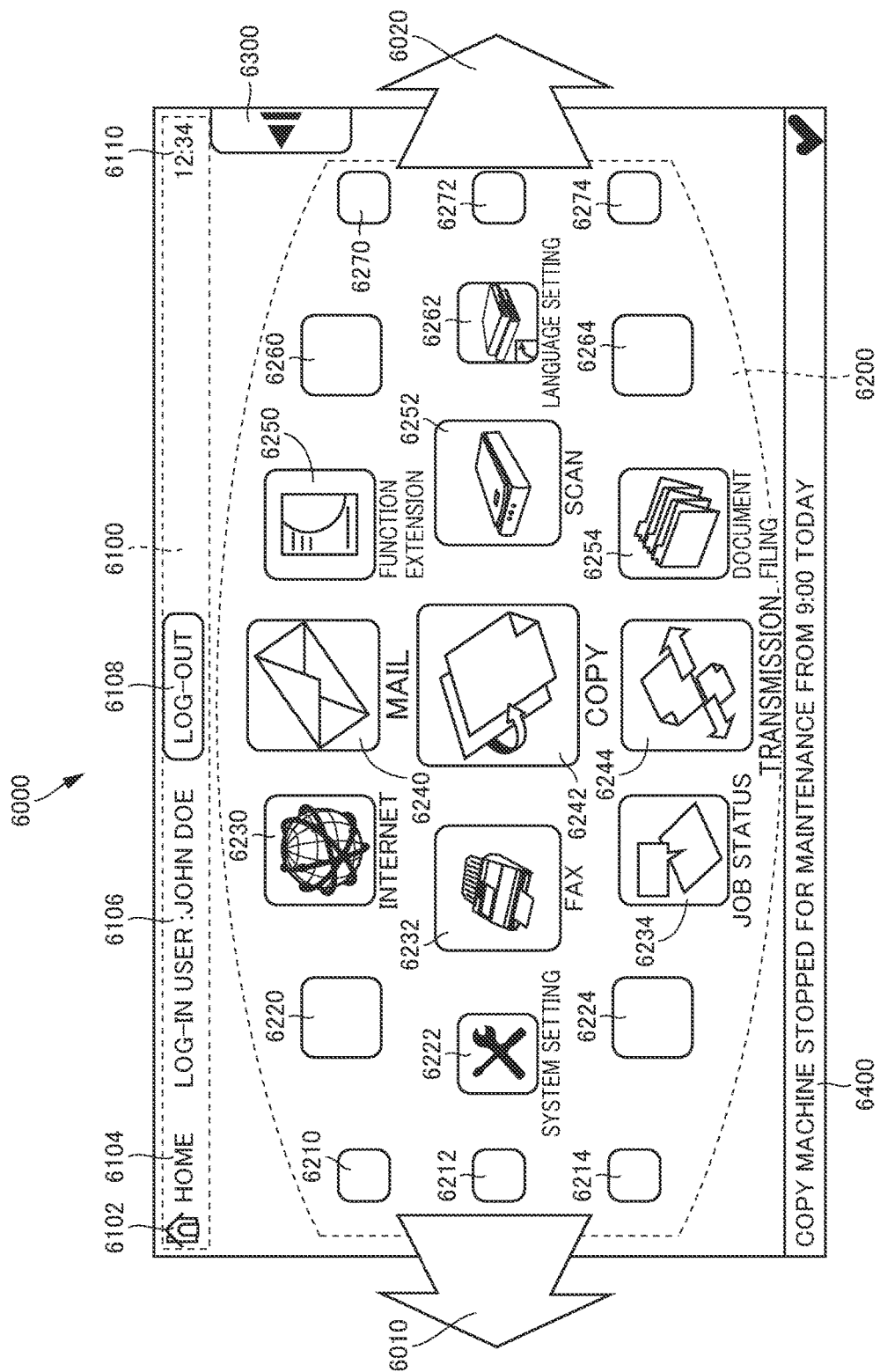
FIGS. 6 and 7 show exemplary screen images displayed on the touch-panel display of the image forming apparatus in accordance with the embodiment of the present invention.

Referring to FIG. 6, home screen image 6000 includes a home system area 6100 corresponding to the system area described above, an icon display area 6200, an icon display switching tub-button 6300, and a memo display area 6400.

On home system area 6100, an area 6102 displaying an icon representing the home screen image, an area 6104 displaying the name of the displayed screen image, an area 6106 displaying the logged-in user name, an area 6108 displaying a log-out button (software button), and an area 6110 displaying the current time, are arranged.

On icon display area 6200, icons 6210-6274 representing operational modes are displayed together with the names or abbreviations of the operational modes. The name or abbreviation of the operational mode is not indispensable. In the present embodiment, there are at least four operational modes (copy mode, facsimile mode, document filing mode, and mail mode). Therefore, an icon 6242 for selecting the copy mode, an icon 6232 for selecting the facsimile mode, an icon 6254 for selecting the document filing mode and an icon 6240 for selecting the mail mode are displayed on icon display area 6200. In FIG. 6, icons for selecting other operational modes, icons for selecting other setting modes (for example, system setting and language setting), and icons for displaying other screen images (for example, job status) are also displayed.

As shown in FIG. 6, in icon display area 6200, icons on the central column (for example, icons 6240, 6242 and 6244) are displayed larger than icons on the left and right sides thereof (for example, icons 6230 and 6250 with respect to icon 6240, icons 6232 and 6252 with respect to icon 6242, and icons 6234 and 6254 with respect to icon 6244). In icon display area 6200, icons at the central row (for example, icons 6232, 6242 and 6252) are displayed larger than icons on the upper and lower sides thereof (for example, icons 6230 and 6234 with respect to icon 6232, icons 6240 and 6244 with respect to icon 6242, and icons 6250 and 6254 with respect to icon 6252). In this manner, in icon display area 6200, the icons are displayed to be horizontally and vertically symmetrical in size, with the size being the largest at the center (center at the central column).

When the user makes a flick operation to the left with his/her finger on icon display area 6200 displayed on the screen of touch-panel display 130, icons displayed on the screen move as if they flow in the direction indicated by an arrow 6010. When the user makes a flick operation to the right, icons displayed on the screen move as if they flow in the direction indicated by an arrow 6020. The distance of movement is determined, for example, in accordance with the width of movement of the finger tip in the flick operation. The distance of movement may be a prescribed distance set in advance for one flick operation. If a manner of display in which a plurality of icons are arranged on a virtual cylinder is adopted for icon display area 6200, it becomes possible to display the icons in an endless manner.

On memo display area 6400, a piece of maintenance information or the like to be notified to every user of image forming apparatus 100 is displayed.

Operation of Displaying Initial Screen Image of Copy Mode

If icon 6242 shown in FIG. 6 is touched, tapped or double tapped by the finger tip of a user, it is determined that the operational mode is selected. If the selected operational mode is the copy mode, the initial screen image of copy mode is displayed on touch-panel display 130. By way of example, an initial screen image 7100 for the copy mode shown in FIG. 7 is displayed on touch-panel display 130. As shown in FIG. 7, copy mode initial screen image 7100 is divided into five areas of the layout described above, on which pieces of information are displayed.

Figure 7:
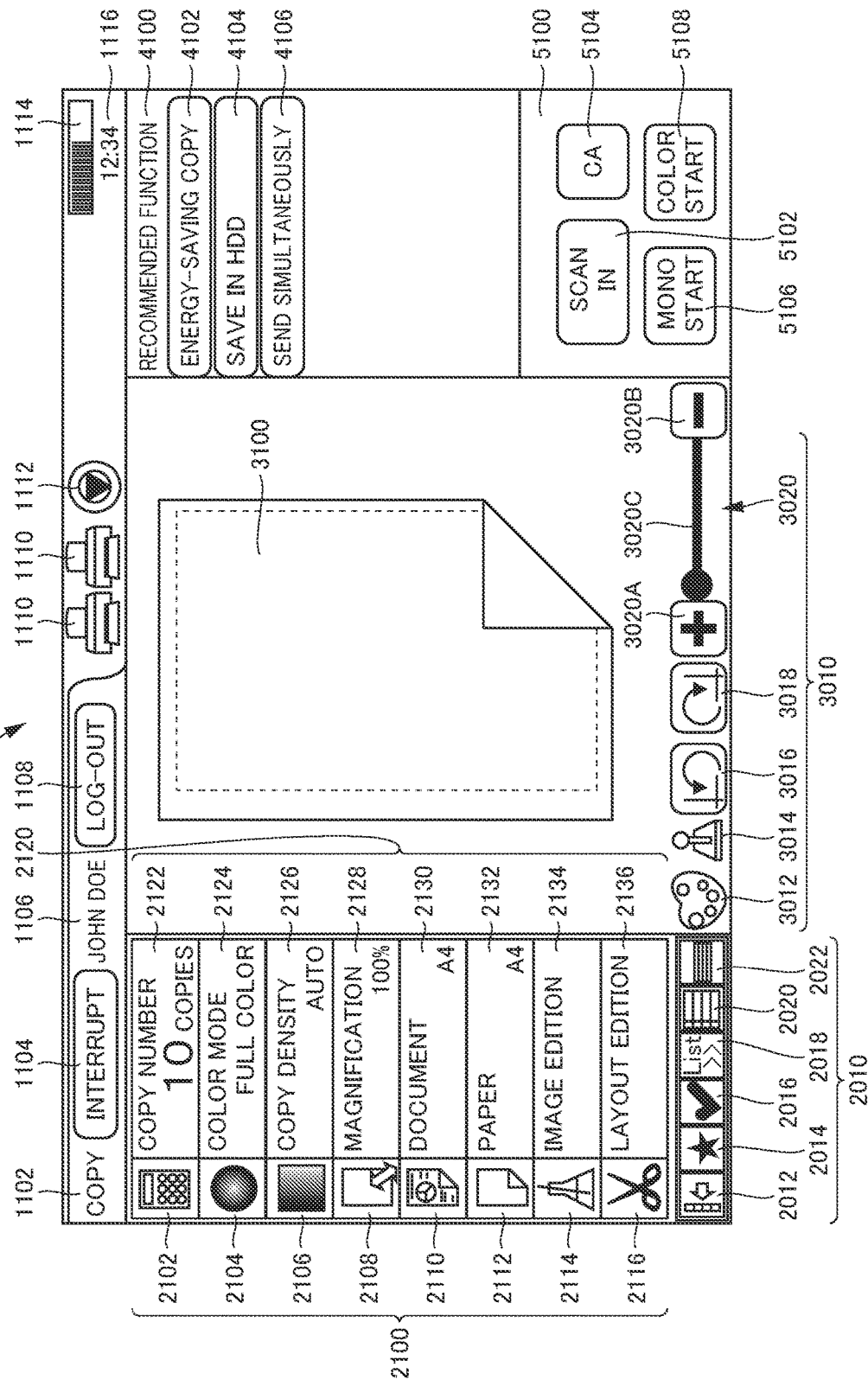

Referring to FIG. 7, on system area 1000 of copy mode initial screen image 7100, an area 1102 indicating the selected operational mode (here, copy mode), an area 1104 displaying sub information related to the selected operational mode, an area 1106 displaying the logged-in user name, an area 1108 displaying a log-out button (software button), an area 1110 displaying the job status of the currently executed job, an area 1112 displaying a button related to the job status (software button), an area 1114 displaying the communication state, and an area 1116 indicating the current time, are arranged.

In area 1102, a name and/or icon representing the operational mode is displayed. It is preferred that if area 1102 is touched, tapped or double-topped, a menu showing operational modes is pulled-down, allowing switching of the operational mode (the same applies to other operational modes).

In area 1104, an interruption key (software button) is displayed as sub information. If the interruption key is touched, tapped or double-tapped, an interruption process can be executed in the copy mode.

In area 1106, job status of the currently executed job is indicated by an icon. If the job status is touched, tapped or double-tapped, detailed information of job status is displayed. Further, it is preferred to display a button or the like to stop the selected job in area 1112.

In function selecting area 2000 of copy mode initial screen image 7100, a function selection menu allowing selection by the user in the copy mode and the group of change buttons 2010 described above are displayed. In the screen image shown in FIG. 7, the function selection menu is displayed in the regular mode.

As shown in FIG. 7, the function selection menu displayed in the regular mode includes a group of icons 2100 and a group of texts 2120. In the function selection menu displayed on function selecting area 2000, displayed are: an icon 2102 for setting the number of copies, and a text 2122 showing the set contents; an icon 2104 for setting color mode, and a text 2124 showing the set contents; an icon 2106 for setting copy density, and a text 2126 showing the set contents; an icon 2108 for setting copy magnification, and a text 2128 showing the set contents; an icon 2110 for setting document type, and a text 2130 showing the set contents; an icon 2112 for setting paper type, and a text 2132 showing the set contents; an icon 2114 for image edition, and a text 2134 showing the set contents; and an icon 2116 for layout edition, and a text 2136 showing the set contents.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Here, image edition refers to image edition of one page of document. A lower layer menu thereof includes frame erasure, print menu, watermark, user stamp and the like. The layout edition refers to image edition of a plurality of pages of the document. The lower layer menu thereof includes page collection, margin, page movement, centering and the like. The lower layer menu of the displayed function selection menu appears on touch-panel display 130 if any of icons 2102 to 2116 or texts 2122 to 2136 is touched, tapped or double-tapped.

In preview area 3000 of copy mode initial screen image 7100, an image of expected document output (finished form) 3100 and the group of preview change buttons 3010 described above are arranged. Here, image 3100 is displayed using dummy data or scanned data. Every time the user changes the function setting menu of function selecting area 2000, image 3100 is changed and displayed on preview area 3000 (preview display is changed).

In action panel area 4000 of copy mode initial screen image 7100, pieces of information related to assistance, guidance and suggestion related to the copy operation are displayed. As shown in FIG. 7, recommended functions in the copy mode selected by the user are displayed. In action panel area 4000, an area 4100 showing the contents of displayed information, and areas 4102 to 4106 showing, as texts, the recommended functions and serving as software buttons are arranged.

When area 4102 is touched, tapped or double-tapped, detailed information of energy-saving copy is pulled-down and displayed. Here, a software button allowing transition to a function setting screen image for double-sided copy is displayed, together with a text message of, for example, "double-sided copy saves paper." At the same time, a software button allowing transition to a function setting screen image for page collection is displayed, together with a text message of "collective printing of pages saves paper."

Further, a software button allowing transition to a function setting screen image for saddle stitch is displayed, together with a text message of "printing for bookbinding available."

In task trigger area 5000 of copy mode initial screen image 7100, a group of execution buttons 5100 is displayed. The group of execution buttons 5100 include: a scan-in key 5102 (software button) for operating image forming apparatus 100 to scan a document and obtain image data; a clear all key 5104 (software button) for clearing set function or functions; a monochrome start key 5106 (software button) for operating image forming apparatus 100 to scan a document and start copying in black and white; and a color start key 5108 (software button) for operating image forming apparatus 100 to scan a document and start color copying. Monochrome start key 5106 or color start key 5108 displayed on task trigger area 5000 has a function equivalent to that of start key 158, and clear all key 5104 displayed on task trigger area 5000 has a function equivalent to that of clear key 152. Therefore, only the software button or hardware button may be provided. Image forming apparatus 100 in accordance with the present embodiment has both software buttons and hardware buttons to attain these functions.

On copy mode initial screen image 7100 having pieces of information displayed on five divided areas, the user inputs various requests. Though the operational mode is not limited to the copy mode, after selecting an operational mode, it is possible that the user has difficulty in operation in the process of inputting requests in the operational mode. In such a situation, the user may wish to have the display on touch-panel display 130 to the home screen image and to start again from the selection of operational mode. If the user so wishes, he/she may simply press home key 148 provided on operation unit 120. Here, it is possible for the user to easily find the home key 148 provided as integral part of touch-panel display 130.

When home key 148 is pressed by the user, the display makes a transition from the screen image of FIG. 7 to the screen image of FIG. 6. Here, the setting (for example, the number of copies set to 10 on the screen image of FIG. 7) made by that time by the user may or may not be saved. If it is saved, after transition of the screen image from FIG. 7 to FIG. 6, when icon 6242 shown in FIG. 6 is touched, tapped or double-tapped by the user's finger, the initial screen image of the copy mode appears on touch-panel display 130, and the saved setting is displayed.

Effects

As described above, in the image forming apparatus in accordance with the present embodiment, the home key for switching the display on the touch-panel display to the home screen image allowing selection of an operational mode is provided to have integrity with the touch-panel display. Specifically, the home key is (1) arranged closer to the touch-panel display than other hardware buttons (power key, energy-saving key, ten keys, clear key, reset key, stop key, start key and the like), and (2) adapted to have a rectangular shape in portrait orientation (while the touch-panel display is in landscape orientation). Because of such a shape, arrangement and structure of the home key, the touch-panel display and the home key are integral and, hence, the user who wishes to have the display on touch-panel display returned to the home screen image can easily find the home key. Therefore, operability of home screen display required by the user can be improved.

First Modification

Next, referring to FIG. 8, a first modification of the image forming apparatus in accordance with the present embodiment will be described. The image forming apparatus in accordance with the present modification differs from the embodiment above (FIG. 2), in the arrangement of power key 1144, energy-saving key 1146 and home key 1148 on operation unit 1120. Except for these points, the modification and the embodiment above are the same and, therefore, detailed description thereof will not be repeated here.

Figure 8:
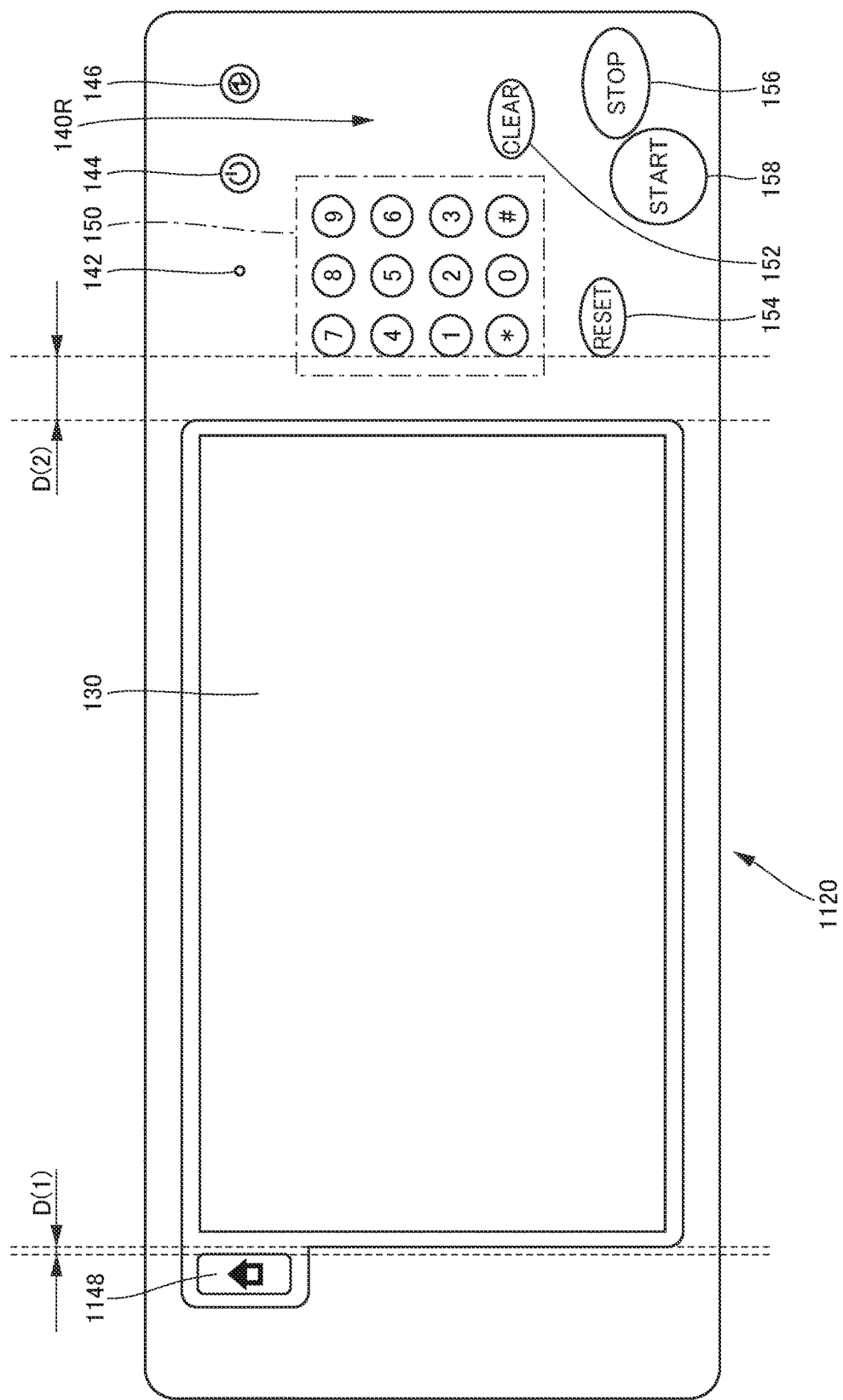
FIGS. 8 to 13 are plan views of the operation units of the image forming apparatus in accordance with first to sixth modifications of the embodiment of the present invention.

As shown in FIG. 8, operation unit 1120 has only a home key 1148 having a rectangular shape in portrait orientation provided on the left side of touch-panel display 130, and distance D (1) between home key 1148 and touch-panel display 130 is shorter than distance D (2) between ten keys 150 or reset key 154, which is closest to the touch-panel display 130 among other keys, to touch-panel display 130. Specifically, among the plurality of hardware buttons (keys), home key 1148 is arranged closest to touch-panel display 130 and, in addition, on the left side of touch-panel display 130, only the home key 1148 is arranged. It is noted that, in the image forming apparatus in accordance with the present modification, the custom key and the confirmation key are realized by software buttons displayed on touch-panel display 130.

As described above, in the image forming apparatus in accordance with the present modification, the home key for switching the display of touch-panel display to the home screen image allowing selection of an operational mode is provided to be integral with the touch-panel display, as a sole hardware button on one side of the touch-panel display. Therefore, the user can easily find the home key.

Second Modification

Figure 9:
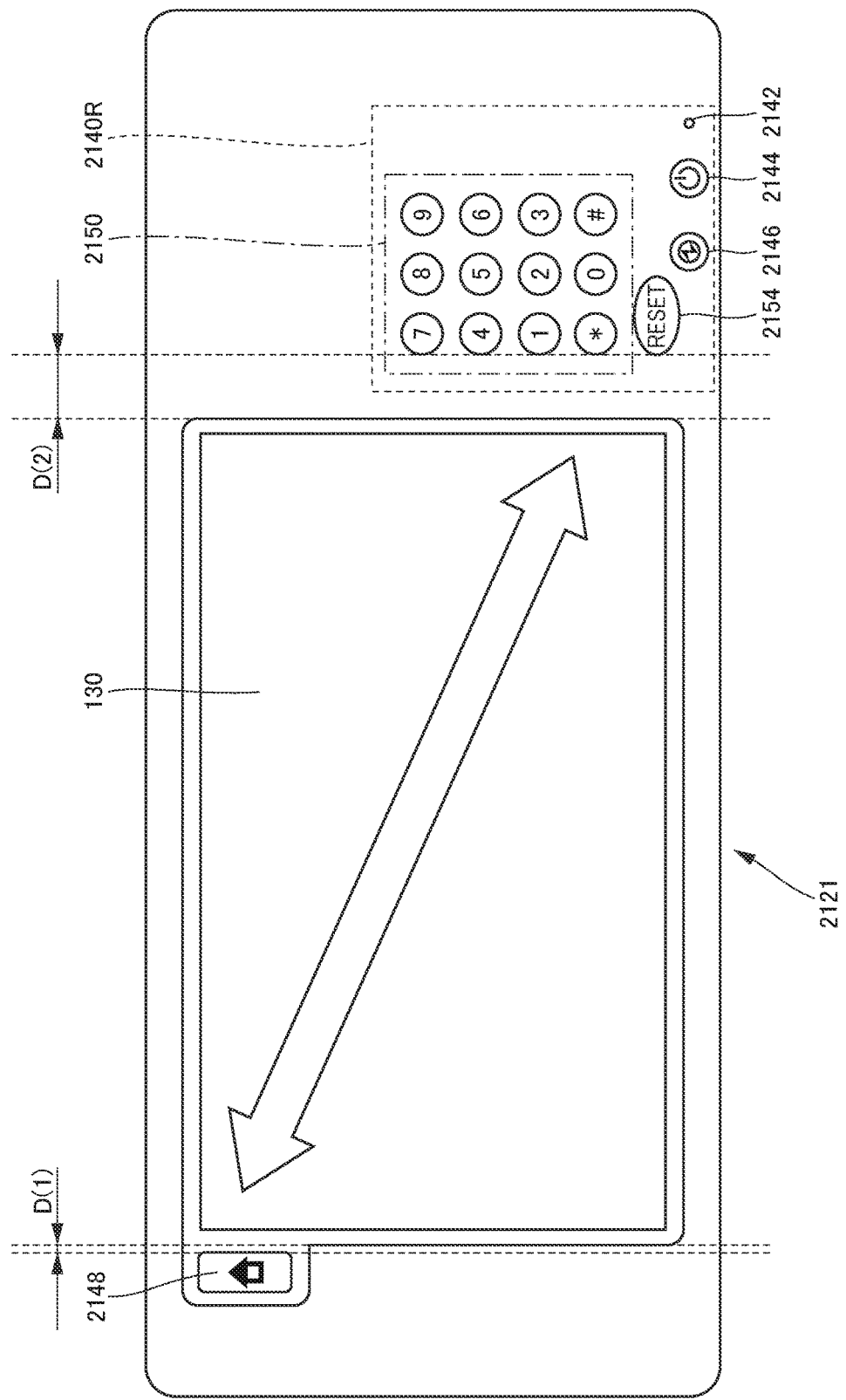

In the following, referring to FIG. 9, a second modification of the image forming apparatus in accordance with the present embodiment will be described. FIG. 9 showing the image forming apparatus in accordance with the present modification corresponds to FIG. 2 or FIG. 8 described above. The image forming apparatus in accordance with the present modification has an operation unit 2121. Operation unit 2121 does not have custom key 160 and confirmation key 162. Further, operation unit 2121 does not have clear key 152, stop key 156 or start key 158, either. Except for these points, the modification and the embodiment above are the same and, therefore, detailed description thereof will not be repeated here.

As shown in FIG. 9, operation unit 2121 has only a home key 2148 having a rectangular shape in portrait orientation provided on the left side of touch-panel display 130, and distance D (1) between home key 2148 and touch-panel display 130 is shorter than distance D (2) between ten keys 2150 or reset key 2154, which is closest to the touch-panel display 130 among other keys, to touch-panel display 130. Specifically, among the plurality of hardware buttons (keys), home key 2148 is arranged closest to touch-panel display 130 and, in addition, on the left side of touch-panel display 130, only the home key 2148 is arranged. Further, right-side display operation unit 2140R and home key 2148 are arranged on a diagonal of touch-panel display 130. Specifically, home key 2148 is arranged on an upper end on the left side of touch-panel display 130, while right-side display operation unit 2140R is arranged next to the lower end of right side of touch-panel display 130. In the example of FIG. 9, right-side display operation unit 140R and home key 2140 are positioned such that among the keys of right-side display operation unit 2140R, one closest to the upper end of touch-panel display 130 has its upper end positioned lower than the lower end of home key 2140.

Though the arrangement is as shown in FIG. 9, it is also possible to have right-side display operation unit 2140R positioned on the upper right side and home key 2148 positioned on the lower left side. The arrangement may be reversed and home key 2148 may be arranged on the right side. It is noted that, in the image forming apparatus in accordance with the present modification, the custom key, confirmation key, clear key, stop key and start key are realized by software buttons displayed on touch-panel display 130.

As described above, in the image forming apparatus in accordance with the present modification, the home key for switching the display of touch-panel display to the home screen image allowing selection of an operational mode is provided to be integral with the touch-panel display, as a sole hardware button on one side of the touch-panel display. Further, it is arranged on a diagonally opposite side with respect to the group of other hardware buttons, with the rectangular touch-panel display positioned therebetween. Therefore, the user can easily find the home key.

Third Modification

Figure 10:
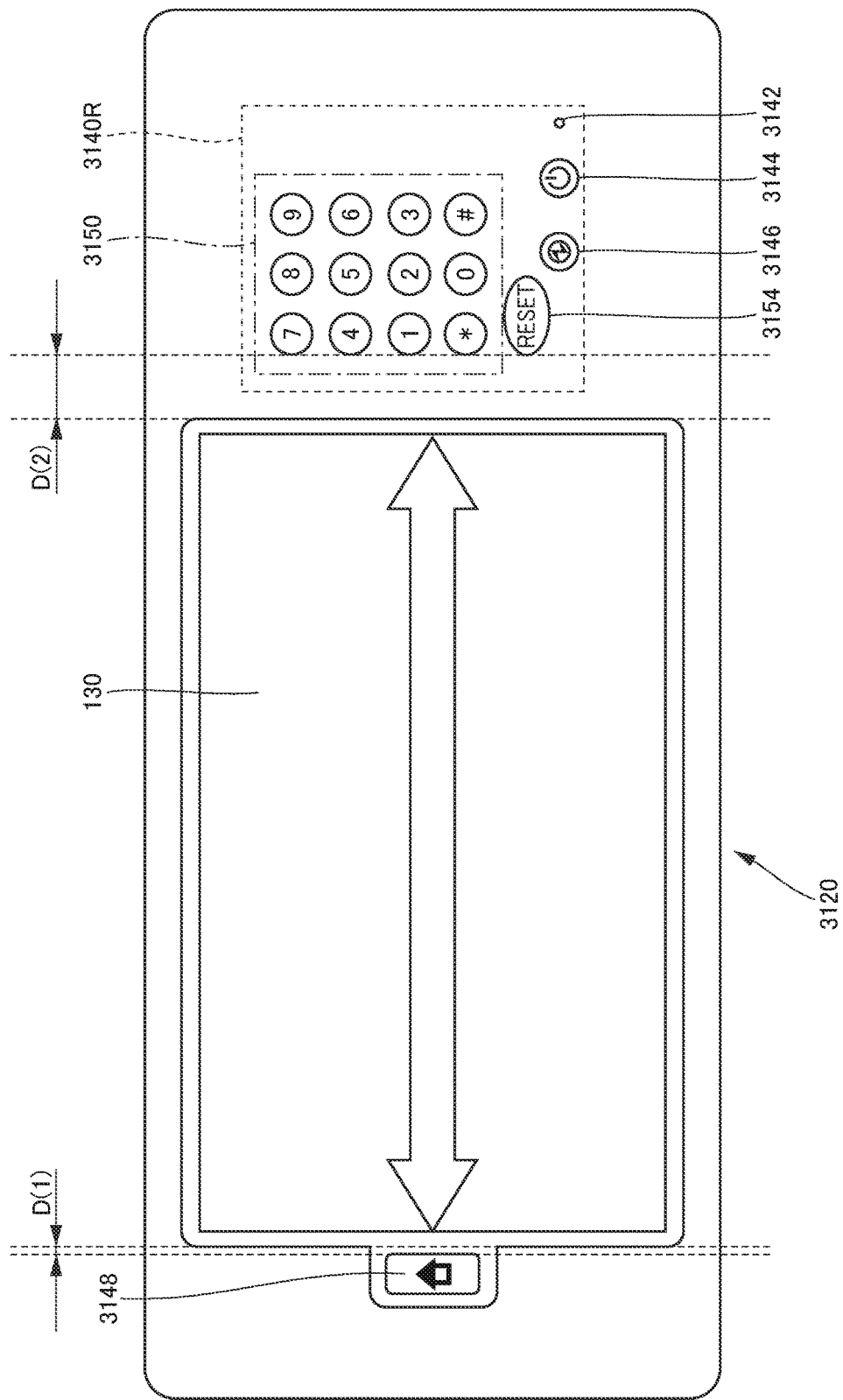

In the following, a third modification of the image forming apparatus in accordance with the present embodiment will be described with reference to FIG. 10. FIG. 10 showing the image forming apparatus in accordance with the present modification corresponds to FIG. 9 described above. In an operation unit 3120 of the image forming apparatus in accordance with the present modification, home key 3148 and a right-side display operation unit 3140R as a group of hardware buttons are arranged aligned at the same height. In the example shown in FIG. 10, home key 3148 and right-side display operation unit 3140R are arranged such that the central positions are aligned with the center of the shorter side of touch-panel display 130. Except for these points, the present modification and the second modification above are the same and, therefore, detailed description thereof will not be repeated here. The positions of home key 3148 and right-side display operation unit 3140R may not be aligned with the center of shorter side of touch-panel display 130, and these may be arranged upper than or lower than that position.

As shown in FIG. 10, operation unit 3120 has only a home key 3148 having a rectangular shape in portrait orientation provided on the left side of touch-panel display 130, and distance D (1) between home key 3148 and touch-panel display 130 is shorter than distance D (2) between ten keys 3150 or reset key 3154, which is closest to the touch-panel display 130 among other keys, to touch-panel display 130. In addition, on the left side of touch-panel display 130, only the home key 3148 is arranged. Further, right-side display operation unit 3140R and home key 3148 are arranged at the same height, with touch-panel display 130 positioned therebetween.

The present invention, however, is not limited to such an arrangement of keys. The right-side display operation unit 3140R may be positioned on the left side and home key 3148 may be positioned on the right side. It is noted that, in the image forming apparatus in accordance with the present modification, the custom key, confirmation key, clear key, stop key and start key are realized by software buttons displayed on touch-panel display 130.

As described above, in the image forming apparatus in accordance with the present modification, the home key for switching the display of touch-panel display to the home screen image allowing selection of an operational mode is provided to be integral with the touch-panel display, as a sole hardware button on one side of the touch-panel display. Further, it is arranged aligned at the same height with respect to the group of other hardware buttons, with the rectangular touch-panel display positioned therebetween. Therefore, the user can easily find the home key.

Fourth Modification

Figure 11:
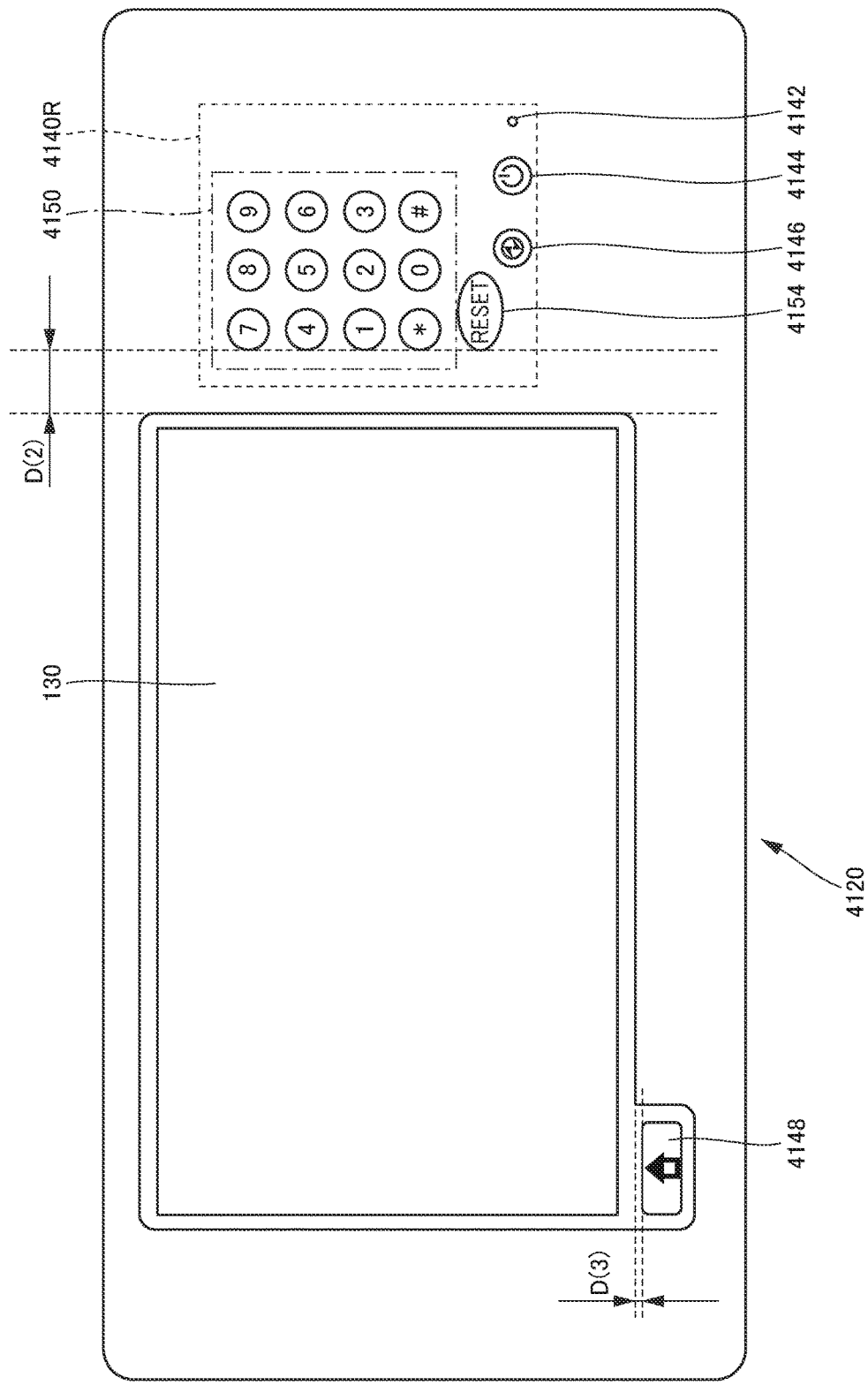

In the following, a fourth modification of the image forming apparatus in accordance with the present embodiment will be described with reference to FIG. 11. FIG. 11 showing the image forming apparatus in accordance with the present modification corresponds to FIG. 10 described above. In an operation unit 4120 of the image forming apparatus in accordance with the present modification, a home key 4148 is positioned adjacent to the lower left corner of touch-panel display 130 from the lower side. A right-side display operation unit 4140R is positioned adjacent to the upper right corner at the position diagonally opposite to the lower left corner of touch-panel display 130, from the right side. Except for these points, the present modification and the third modification above are the same and, therefore, detailed description thereof will not be repeated here.

As shown in FIG. 11, operation unit 4120 has only a home key 4148 having a rectangular shape in landscape orientation provided on the lower side of touch-panel display 130, and distance D (3) between home key 4148 and touch-panel display 130 is shorter than distance D (2) between ten keys 4150 or reset key 4154, which is closest to the touch-panel display 130 among other keys, to touch-panel display 130. Specifically, among the plurality of hardware buttons (keys), home key 4148 is arranged closest to touch-panel display 130 and, in addition, on the lower side and left side of touch-panel display 130, only the home key 4148 is arranged.

The present invention, however, is not limited to such an arrangement of keys. The right-side display operation unit 4140R may be positioned on the left side and home key 4148 may be positioned on the lower right side, or right-side display operation unit 4140R may be positioned on the left side and home key 4148 may be positioned on the upper right side. It is noted that, in the image forming apparatus in accordance with the present modification, the custom key, confirmation key, clear key, stop key and start key are realized by software buttons displayed on touch-panel display 130.

As described above, in the image forming apparatus in accordance with the present modification, the home key for switching the display of touch-panel display to the home screen image allowing selection of an operational mode is provided to be integral with the touch-panel display, as a sole hardware button on one side of the touch-panel display. Further, the home key and the group of other hardware buttons are arranged at positions adjacent to two different sides of the rectangular touch-panel display. Therefore, the user can easily find the home key.

Fifth Modification

Figure 12:
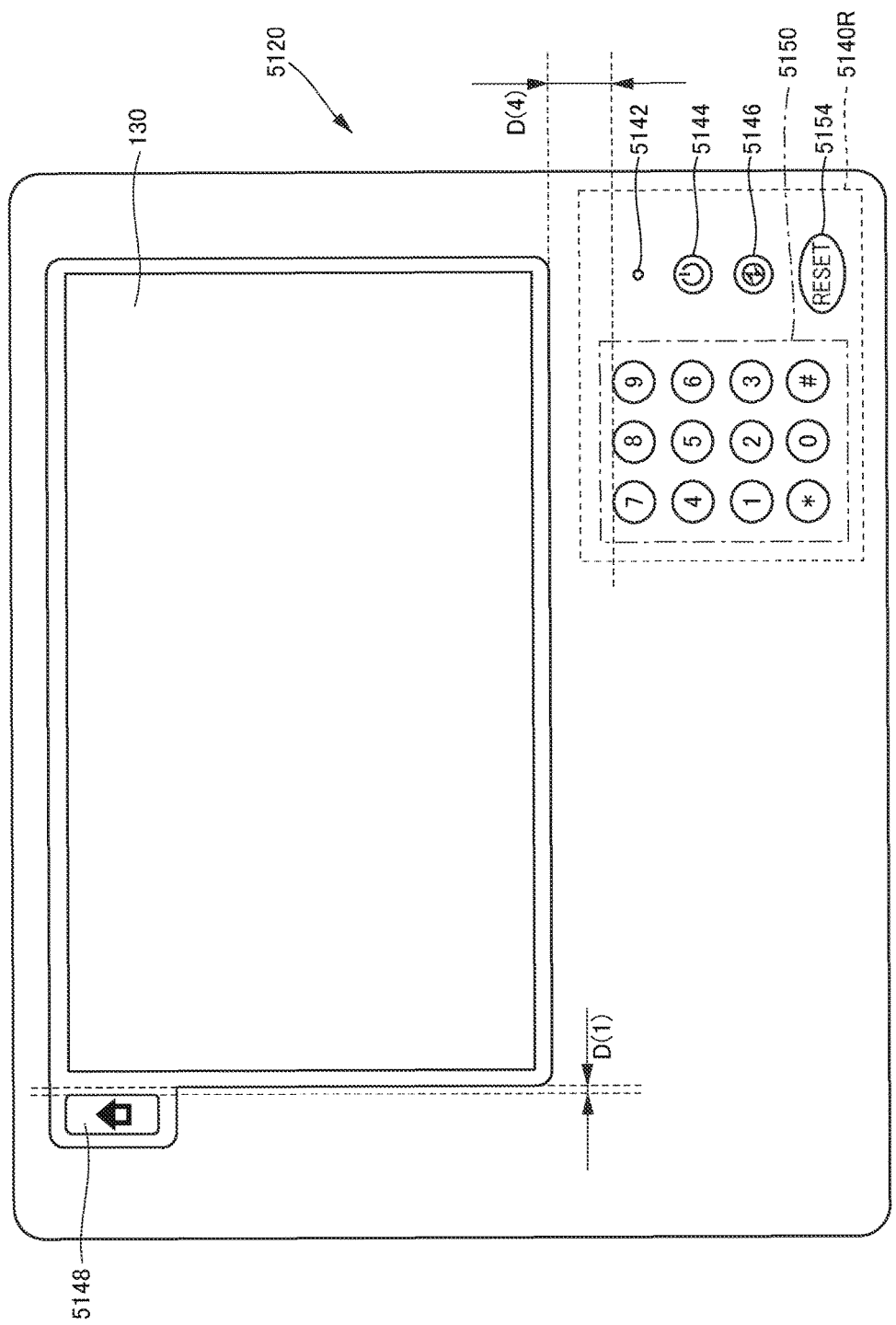

In the following, a fifth modification of the image forming apparatus in accordance with the present embodiment will be described with reference to FIG. 12. FIG. 12 showing the image forming apparatus in accordance with the present modification corresponds to FIG. 8 described above. In an operation unit 5120 of the image forming apparatus in accordance with the present modification, a home key 5148 is positioned adjacent to the upper left corner of touch-panel display 130 from the left side, along the shorter side of touch-panel display 130. A right-side display operation unit 5140R is positioned adjacent to the lower right corner at the position diagonally opposite to the upper left corner of touch-panel display 130, from the lower side. Except for these points, the present modification and the first modification above are the same and, therefore, detailed description thereof will not be repeated here.

As shown in FIG. 12, operation unit 5120 has only a home key 5148 having a rectangular shape in portrait orientation provided on the left side of touch-panel display 130. Distance D (1) between home key 5148 and touch-panel display 130 is shorter than distance D (4) between ten keys 4150, which are closest to the touch-panel display 130 among other keys, to touch-panel display 130. In addition, on the lower side and left side of touch-panel display 130, only the home key 5148 is arranged.

The present invention, however, is not limited to such an arrangement of keys. The right-side display operation unit 5140R may be positioned on the lower left side and home key 5148 may be positioned on the upper right side. It is noted that, in the image forming apparatus in accordance with the present modification, the custom key, confirmation key, clear key, stop key and start key are realized by software buttons displayed on touch-panel display 130.

As described above, in the image forming apparatus in accordance with the present modification, the home key for switching the display of touch-panel display to the home screen image allowing selection of an operational mode is provided to be integral with the touch-panel display, as a sole hardware button on one side of the touch-panel display. Further, the home key and the group of other hardware buttons are arranged at positions adjacent to two different sides of the rectangular touch-panel display. Therefore, the user can easily find the home key.

Sixth Modification

Figure 13:
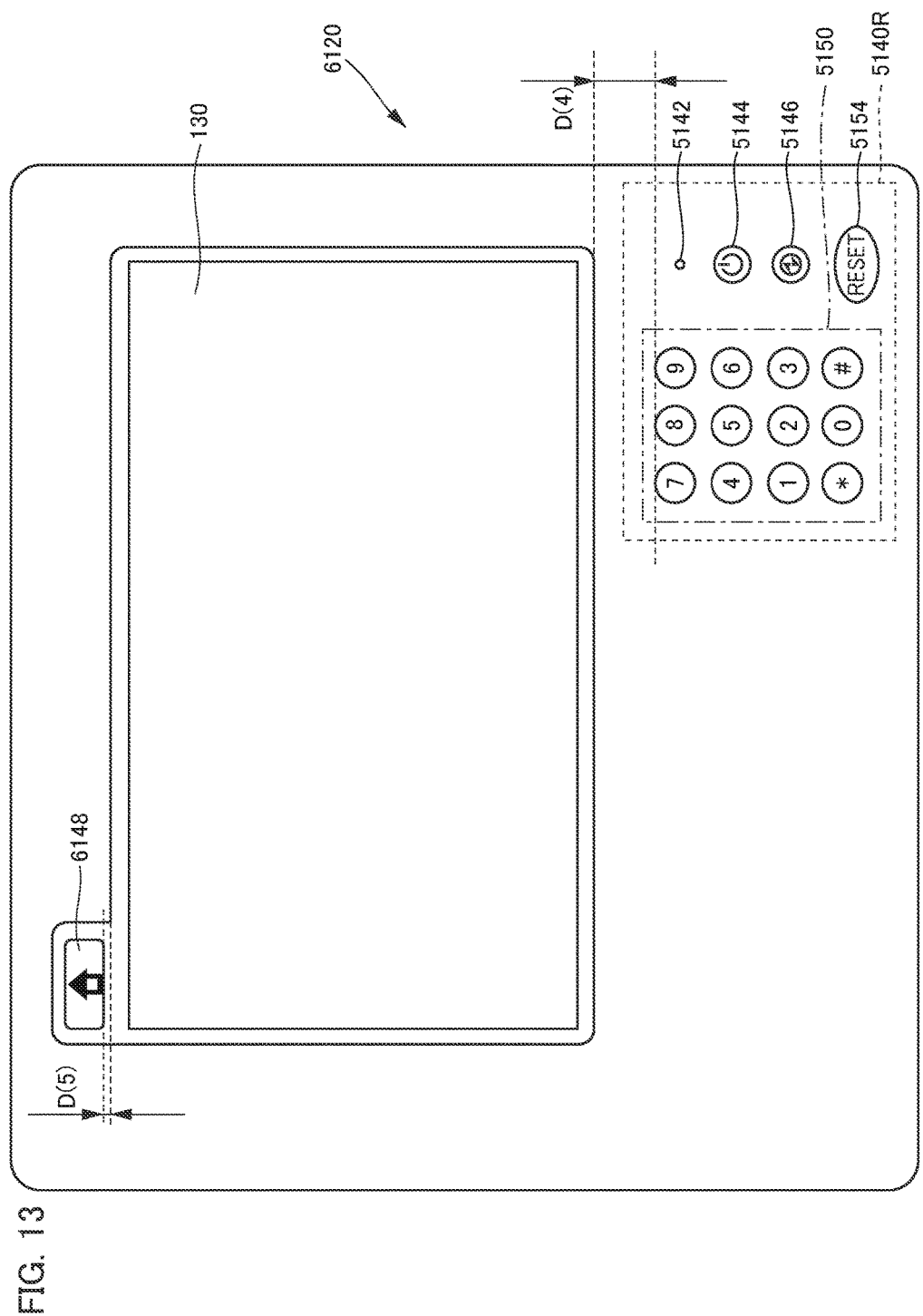

In the following, a sixth modification of the image forming apparatus in accordance with the present embodiment will be described with reference to FIG. 13. FIG. 13 showing the image forming apparatus in accordance with the present modification corresponds to FIG. 8 described above. In an operation unit 6120 of the image forming apparatus in accordance with the present modification, a home key 6148 is positioned adjacent to the upper left corner of touch-panel display 130 from the upper side, along the longer side of touch-panel display 130. A right-side display operation unit 6140R is positioned adjacent to the lower right corner at the position diagonally opposite to the upper left corner of touch-panel display 130, from the upper side along the longer side. Except for these points, the present modification and the first modification above are the same and, therefore, detailed description thereof will not be repeated here.

As shown in FIG. 13, operation unit 6120 has only a home key 6148 having a rectangular shape in landscape orientation provided on the upper left side of touch-panel display 130. Distance D (5) between home key 6148 and touch-panel display 130 is shorter than distance D (4) between ten keys 5150, which are closest to the touch-panel display 130 among other keys, to touch-panel display 130. In addition, on the upper side and left side of touch-panel display 130, only the home key 6148 is arranged.

The present invention, however, is not limited to such an arrangement of keys. The right-side display operation unit 5140R may be positioned on the lower left side and home key 6148 may be positioned on the upper right side. It is noted that, in the image forming apparatus in accordance with the present modification, the custom key, confirmation key, clear key, stop key and start key are realized by software buttons displayed on touch-panel display 130.

As described above, in the image forming apparatus in accordance with the present modification, the home key for switching the display of touch-panel display to the home screen image allowing selection of an operational mode is provided to be integral with the touch-panel display, as a sole hardware button on one side of the touch-panel display. Further, the home key and the group of other hardware buttons are arranged at positions adjacent to two different sides of the rectangular touch-panel display. Therefore, the user can easily find the home key.

Modification Common to the Embodiment and All Modifications

In the description above, the home key is provided not on the same side as the power key and/or energy-saving key. As shown in FIG. 2, the home key is provided on the same side as the custom key or confirmation key, or as shown in FIGS. 8 to 12, it is provided alone. The home key, however, may be provided on the same side as the power key and/or energy-saving key. Even in that case, however, it is desirable to limit the number of keys to only a few on the side of home key, so as to prevent confusion of the user caused by too many keys. Further, among these keys, the home key is arranged closest to the touch-panel display.

In the foregoing description and in the figures showing the touch-panel display, the member arranged around the touch-panel display is designed to protrude near the home key to enclose the home key. The present invention, however, is not limited to include such a member.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console used in relation to an apparatus as an object of control operated by an operation of a user, comprising:
    a display device having a display area for displaying information to the user;
    an input device for the user to input a request; and
    a display control device displaying, if a request for displaying specific information on said display device is input through said input device, said specific information on said display area; wherein
    said input device includes a plurality of hardware operation buttons for inputting a plurality of requests, corresponding to respective requests, arranged in an area adjacent to an outer perimeter of said display device;
    said operation console is used in relation to an apparatus as an object of control operating in an operational mode selected by an operation of a user from among a plurality of operational modes;
    said specific information is mode selection information allowing selection of one operational mode from among two or more modes of a copy mode, a FAX mode, a document filing mode and a mail mode;
    the shape of said display device is a rectangle;
    one hardware mode operation button from among the plurality of hardware operation buttons for inputting the request for displaying said specific information is provided on a first area adjacent to one side of said rectangle;
    the hardware operation button or buttons including the one hardware mode operation button provided on said first area are smaller in number than the hardware operation buttons provided on at least one of three second areas each being adjacent to one of three sides other than said one side;
    said mode selection information includes icons respectively corresponding to said two or more modes; and
    of said icons, one that is displayed on said display area is switched to a different icon in accordance with a user operation.

2. The operation console according to claim 1, wherein said user operation is an operation on said display area.

3. The operation console according to claim 1, wherein said user operation is an operation of causing said icon displayed on said display area to move to left/right direction.

4. The operation console according to claim 1, wherein information for a user is displayed below said specific information, on said display area.

5. The operation console according to claim 1, wherein a pilot lamp is provided on said at least one area.

6. The operation console according to claim 1, wherein the hardware operation buttons provided on said at least one area includes at least two selected from a group consisting of a ten-key, a start key for instructing a start of a process in the selected operational mode, and a stop key for stopping said process.

7. The operation console according to claim 6, wherein said one side is a shorter side of said rectangle.

8. An image processing apparatus provided with the operation console according to claim 1.

* * * * *